(12) United States Patent
Saha

(10) Patent No.: US 12,273,058 B2
(45) Date of Patent: Apr. 8, 2025

(54) ROTATING ELECTRICAL MACHINE CONTROL SYSTEM

(71) Applicant: AISIN CORPORATION, Aichi (JP)

(72) Inventor: Subrata Saha, Kariya (JP)

(73) Assignee: AISIN CORPORATION, Kariya (JP)

( * ) Notice: Subject to any disclaimer, the term of this patent is extended or adjusted under 35 U.S.C. 154(b) by 64 days.

(21) Appl. No.: 18/032,664

(22) PCT Filed: Feb. 2, 2022

(86) PCT No.: PCT/JP2022/004059
§ 371 (c)(1),
(2) Date: Apr. 19, 2023

(87) PCT Pub. No.: WO2022/168868
PCT Pub. Date: Aug. 11, 2022

(65) Prior Publication Data
US 2023/0387846 A1    Nov. 30, 2023

(30) Foreign Application Priority Data
Feb. 5, 2021    (JP) ................. 2021-017729

(51) Int. Cl.
H02P 27/08    (2006.01)
H02M 1/32    (2007.01)
H02M 7/5395    (2006.01)
H02P 25/22    (2006.01)
H02P 29/028    (2016.01)

(52) U.S. Cl.
CPC ........... *H02P 27/08* (2013.01); *H02M 1/325* (2021.05); *H02M 7/5395* (2013.01); *H02P 25/22* (2013.01); *H02P 29/028* (2013.01)

(58) Field of Classification Search
CPC ........ H02P 27/08; H02P 25/22; H02P 29/028; H02P 29/024; H02M 1/325; H02M 7/5395; H02M 1/32; H02M 7/5387
USPC ................. 318/801, 800, 799, 798, 767, 727
See application file for complete search history.

(56) References Cited

U.S. PATENT DOCUMENTS 8,624,534 B2 * 1/2014 Iwatsuki ................... H02P 6/10
318/400.17

FOREIGN PATENT DOCUMENTS

JP    2014-192950 A    10/2014

* cited by examiner

*Primary Examiner* — David Luo
(74) *Attorney, Agent, or Firm* — Oliff PLC

(57) ABSTRACT

When a difference between a first wave height value of a current flowing through a first direct-current power supply and a second wave height value of a current flowing through a second direct-current power supply is greater than or equal to a determination threshold value and the first wave height value is larger than the second wave height value, a control part in a rotating electrical machine control system determines that a first smoothing capacitor has an open-circuit failure, and when a difference between the first wave height value and the second wave height value is greater than or equal to the determination threshold value and the second wave height value is larger than the first wave height value, the control part determines that a second smoothing capacitor has an open-circuit failure.

12 Claims, 14 Drawing Sheets

ROTATING ELECTRICAL MACHINE CONTROL SYSTEM

TECHNICAL FIELD

The present disclosure relates to a rotating electrical machine control system that controls, through two inverters, drive of a rotating electrical machine having open-end windings.

BACKGROUND ART

There is known a rotating electrical machine control system that controls drive of a rotating electrical machine of a three-phase alternating-current type by performing switching control on inverters each provided at each end side of three-phase open-end windings included in the rotating electrical machine. JP 2014-192950 A discloses an example of such a rotating electrical machine control system. A smoothing capacitor for smoothing direct-current voltage is connected to a direct-current side of each inverter. This literature discloses a technique in which even if a failure has occurred in a switching element in an inverter that drives the three-phase open-end windings, drive of the rotating electrical machine can be continued. According to the literature, when a failure has occurred in a switching element in either one of the two inverters, all upper-stage-side switching elements or all lower-stage-side switching elements in an inverter including the failed switching element are all brought into on state and all switching elements on the other side are brought into off state so that the inverter serves as a neutral point, by which the rotating electrical machine is driven by the other inverter having no failure.

CITATIONS LIST

Patent Literature

Patent Literature 1: JP 2014-192950 A

SUMMARY OF DISCLOSURE

Technical Problems

A location where a failure occurs in such a rotating electrical machine control system is not limited to a switching element in an inverter. As described above, a smoothing capacitor for smoothing direct-current voltage is connected to a direct-current side of an inverter that converts electric power between direct current and alternating current. When some kind of failure has occurred in the smoothing capacitor, the capacitance of the smoothing capacitor may decrease or the resistance of the smoothing capacitor may become very small. Since the smoothing capacitor is provided for each inverter, as with a failure of a switching element such as that described above, the rotating electrical machine control system can continue drive of the rotating electrical machine by using an inverter to which a smoothing capacitor having no failure is connected. However, the above-described literature does not mention handling of a failure of a smoothing capacitor.

In view of the above description, it is desired to provide a technique in which when a failure has occurred in one of smoothing capacitors provided for respective two inverters each provided at each end side of open-end windings, the failed smoothing capacitor is identified.

Solutions to Problems

A rotating electrical machine control system that considers the above description and that controls drive of a rotating electrical machine having open-end windings of a plurality of phases that are independent of each other includes: a first inverter connected to a one-end side of the open-end windings; a second inverter connected to an other-end side of the open-end windings; a first direct-current power supply to which the first inverter is connected; a second direct-current power supply to which the second inverter is connected; a first smoothing capacitor connected in parallel to the first direct-current power supply; a second smoothing capacitor connected in parallel to the second direct-current power supply; and a control part that can control the first inverter and the second inverter independently of each other, and when a difference between a first wave height value and a second wave height value is greater than or equal to a determination threshold value defined in advance and the first wave height value is larger than the second wave height value, the control part determines that the first smoothing capacitor has an open-circuit failure, and when a difference between the first wave height value and the second wave height value is greater than or equal to the determination threshold value and the second wave height value is larger than the first wave height value, the control part determines that the second smoothing capacitor has an open-circuit failure, the first wave height value being a wave height value of a current flowing through the first direct-current power supply and the second wave height value being a wave height value of a current flowing through the second direct-current power supply.

If the capacitance of a smoothing capacitor decreases, then when, for example, ripples have occurred in a current flowing through a direct-current power supply, the ability to smooth the ripples decreases, increasing the wave height value of the ripples. When the capacitance is reduced due to occurrence of an open-circuit failure in one of the first smoothing capacitor and the second smoothing capacitor, a difference in ripple smoothing ability between the first smoothing capacitor and the second smoothing capacitor increases, increasing a difference between the wave height values of ripples. The difference tends to increase as a difference between electrostatic capacities increases, and thus, when the difference is greater than or equal to the determination threshold value, the control part can determine that an open-circuit failure has occurred in either one of the smoothing capacitors. Note that according to experiments and simulations performed by the inventor, it has been found that a smoothing capacitor having caused an open-circuit failure and a normal smoothing capacitor have the same trend regarding an increase and a decrease in the magnitude of the wave height value, and thus, it is difficult to distinguish therebetween and the magnitude of the wave height value is not appropriate to use to determine a failure. Note, however, that in a smoothing capacitor with a reduced electrostatic capacity, the wave height value increases greatly, and thus, when one of the smoothing capacitors has an open-circuit failure, a difference between wave height values increases. Thus, the control part can appropriately determine, by the difference, whether a smoothing capacitor has an open-circuit failure. In addition, since the ripple smoothing ability decreases as the electrostatic capacity decreases, the wave height value of ripples increases. Thus, the control part can determine that an open-circuit failure has occurred in one of the smoothing capacitors with a larger wave height value. As such, according to this configuration, when a failure has occurred in one of the smoothing capacitors provided for the respective two inverters each provided at each end side of the open-end windings, the failed smoothing capacitor can be identified.

Further features and advantages of the rotating electrical machine control system will become apparent from the following description of an illustrative and non-restrictive embodiment which will be described with reference to drawings.

DESCRIPTION OF EMBODIMENTS

Figure 1:
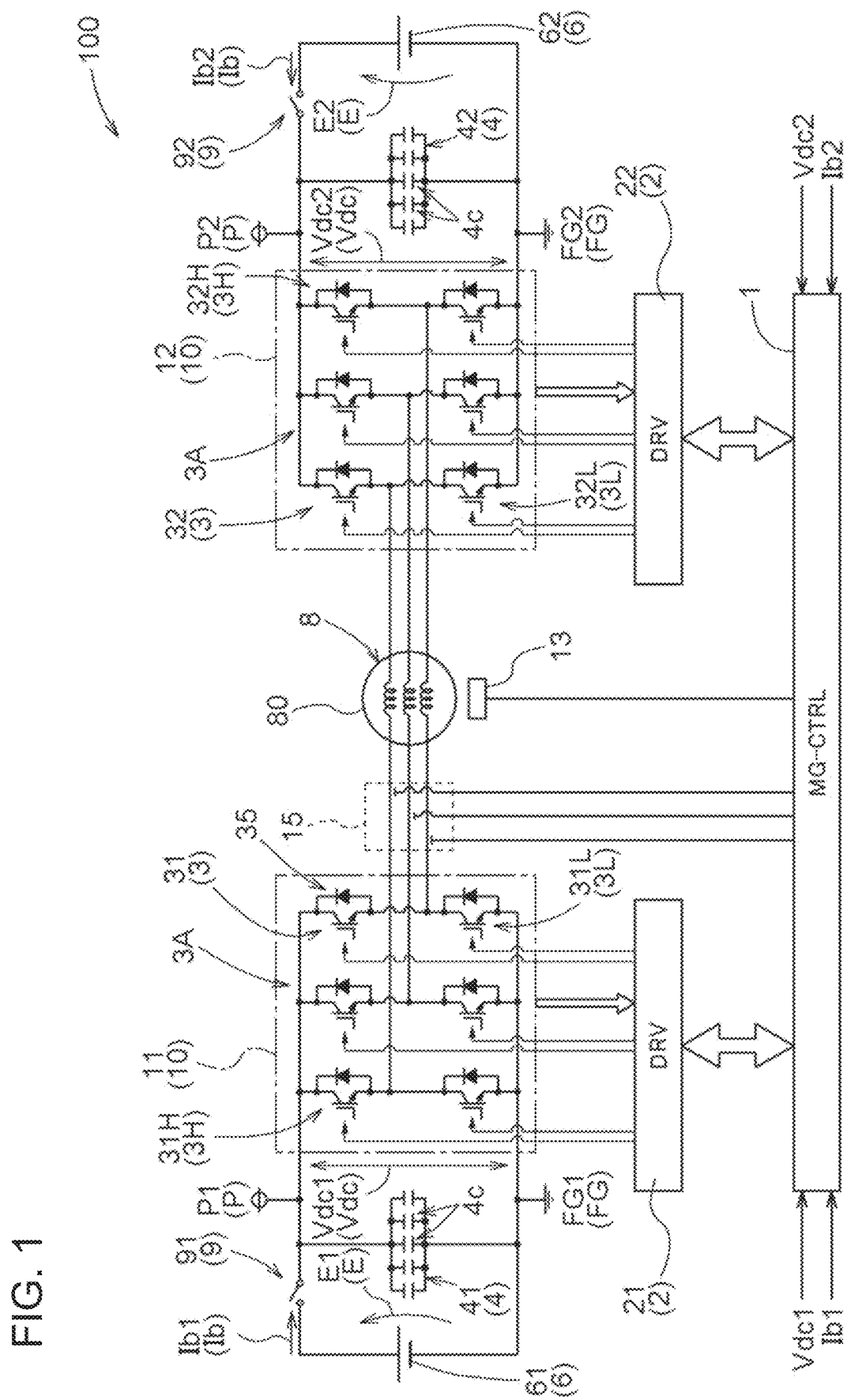
FIG. 1 is a schematic block diagram of a rotating electrical machine drive system.

An embodiment of a rotating electrical machine control device that controls, through two inverters, drive of a rotating electrical machine having open-end windings of a plurality of phases that are independent of each other will be described below based on the drawings. FIG. 1 is a schematic block diagram of a rotating electrical machine control system 100 including a rotating electrical machine control device 1 (MG-CTRL). A rotating electrical machine 80 serves as, for example, a drive power source for wheels of a vehicle such as an electric vehicle or a hybrid vehicle. The rotating electrical machine 80 is an open-end winding type rotating electrical machine having stator coils 8 (open-end windings) of a plurality of phases (three phases in the present embodiment) that are independent of each other. Inverters 10 that are controlled independently of each other to convert electric power between direct current and alternating currents of a plurality of phases (here, three phases) each are connected to each end side of the stator coils 8. That is, a first inverter 11 (INV1) is connected to a one-end side of the stator coils 8, and a second inverter 12 (INV2) is connected to an other-end side of the stator coils 8. In the following description, when the first inverter 11 and the second inverter 12 do not need to be distinguished from each other, the first inverter 11 and the second inverter 12 are simply referred to as the inverters 10.

The inverters 10 each are configured to include a plurality of switching elements 3. For the switching elements 3, insulated gate bipolar transistors (IGBTs) or power metal oxide semiconductor field effect transistors (MOSFETs) are used. FIG. 1 exemplifies a mode in which IGBTs are used as the switching elements 3. In the present embodiment, the first inverter 11 and the second inverter 12 are the inverters 10 of the same circuit configuration that use the same type of switching elements 3.

In the two inverters 10, each arm 3A for one alternating-current phase includes a series circuit of an upper-stage-side switching element 3H and a lower-stage-side switching element 3L. Each switching element 3 has a freewheeling diode 35 provided in parallel thereto, with a direction going from a negative polarity FG to a positive polarity P (a direction going from a lower-stage side to an upper-stage side) being a forward direction. Note that in the arms 3A of a plurality of phases, a side that includes the upper-stage-side switching elements 3H is referred to as upper-stage-side arms, and a side that includes the lower-stage-side switching elements 3L is referred to as lower-stage-side arms.

In addition, in the present embodiment, the two inverters 10 are connected to direct-current power supplies 6 that are independent of each other. That is, a first floating ground FG1 which is the negative polarity FG of the first inverter 11 and a second floating ground FG2 which is the negative polarity FG of the second inverter 12 are independent of each other. In addition, a direct-current link capacitor (smoothing capacitor 4) that smooths direct-current voltage is provided between each inverter 10 and a corresponding direct-current power supply 6.

Specifically, a first smoothing capacitor 41 is connected to a direct-current side of the first inverter 11 in which an arm 3A for one alternating-current phase includes a series circuit of a first upper-stage-side switching element 31H and a first lower-stage-side switching element 31L, and the first inverter 11 is connected on its direct-current side to a first direct-current power supply 61 and connected on its alternating-current side to the one-end side of the stator coils 8 of a plurality of phases, to convert electric power between direct current and alternating currents of a plurality of phases. A second smoothing capacitor 42 is connected to a direct-current side of the second inverter 12 in which an arm 3A for one alternating-current phase includes a series circuit of a second upper-stage-side switching element 32H and a second lower-stage-side switching element 32L, and the second inverter 12 is connected on its direct-current side to a second direct-current power supply 62 and connected on its alternating-current side to the other-end side of the stator coils 8 of a plurality of phases, to convert electric power between direct current and alternating currents of a plurality of phases.

In the present embodiment, the first direct-current power supply 61 and the second direct-current power supply 62 are direct-current power supplies having equal ratings of voltage, etc., and the first smoothing capacitor 41 and the second smoothing capacitor 42 are capacitors having equal ratings of capacitance, etc. As shown in FIG. 1, each smoothing capacitor 4 includes a plurality of capacitor cells 4C connected in parallel to each other. The rated voltage of the direct-current power supplies 6 is about 48 volts to 400 volts. The direct-current power supplies 6 include, for example, secondary batteries (batteries) such as nickel-hydrogen batteries or lithium-ion batteries, or electric energy storage devices such as electric double-layer capacitors. The rotating electrical machine 80 can function as both an electric motor and a generator. The rotating electrical machine 80 converts electric power from the direct-current power supplies 6 into mechanical power through the inverters 10 (powering). Alternatively, the rotating electrical machine 80 converts rotary drive power transmitted from the wheels, etc., into electric power to charge the direct-current power supplies 6 through the inverters 10 (regeneration).

As shown in FIG. 1, the inverters 10 are controlled by the rotating electrical machine control device 1 (control part). The rotating electrical machine control device 1 can control the first inverter 11 and the second inverter 12 using control schemes that are independent of each other (details of the control schemes will be described later). The rotating electrical machine control device 1 is constructed using a logic circuit such as a microcomputer, as a core member. For example, the rotating electrical machine control device 1 controls the rotating electrical machine 80 through the inverters 10 by performing current feedback control that uses a vector control method, based on target torque (torque instruction) of the rotating electrical machine 80 that is provided from other control devices, etc., such as a vehicle control device which is not shown.

Between the direct-current power supply 6, and the inverter 10 and the smoothing capacitor 4 there is provided a contactor 9 that establishes and cuts off an electrical connection therebetween. Specifically, a first contactor 91 is provided between the first inverter 11 and the first smoothing capacitor 41, and the first direct-current power supply 61, and a second contactor 92 is provided between the second inverter 12 and the second smoothing capacitor 42, and the second direct-current power supply 62. The contactor 9 is controlled by the above-described vehicle control device which is not shown or the rotating electrical machine control device 1 to electrically connect the direct-current power supply 6 to the inverter 10 and the smoothing capacitor 4 in a closed state (CLOSE), and to cut off the electrical connection therebetween in an open state (OPEN). The contactor 9 includes, for example, a relay.

An actual current flowing through a stator coil 8 of each phase of the rotating electrical machine 80 is detected by a current sensor 15, and a magnetic pole position at each time point of a rotor of the rotating electrical machine 80 is detected by a rotation sensor 13 such as a resolver. The rotating electrical machine control device 1 performs current feedback control using results of detection by the current sensor 15 and the rotation sensor 13. The rotating electrical machine control device 1 is configured to include various functional parts to perform current feedback control, and each functional part is implemented by cooperation of hardware such as a microcomputer and software (program). In addition, a direct-current link voltage Vdc which is a voltage on the direct-current side of each inverter 10 is detected by a voltage sensor which is not shown, and can be obtained by the rotating electrical machine control device 1. The rotating electrical machine control device 1 obtains a first direct-current link voltage Vdc1 which is a voltage on the direct-current side of the first inverter 11 and a second direct-current link voltage Vdc2 which is a voltage on the direct-current side of the second inverter 12.

Figure 2:
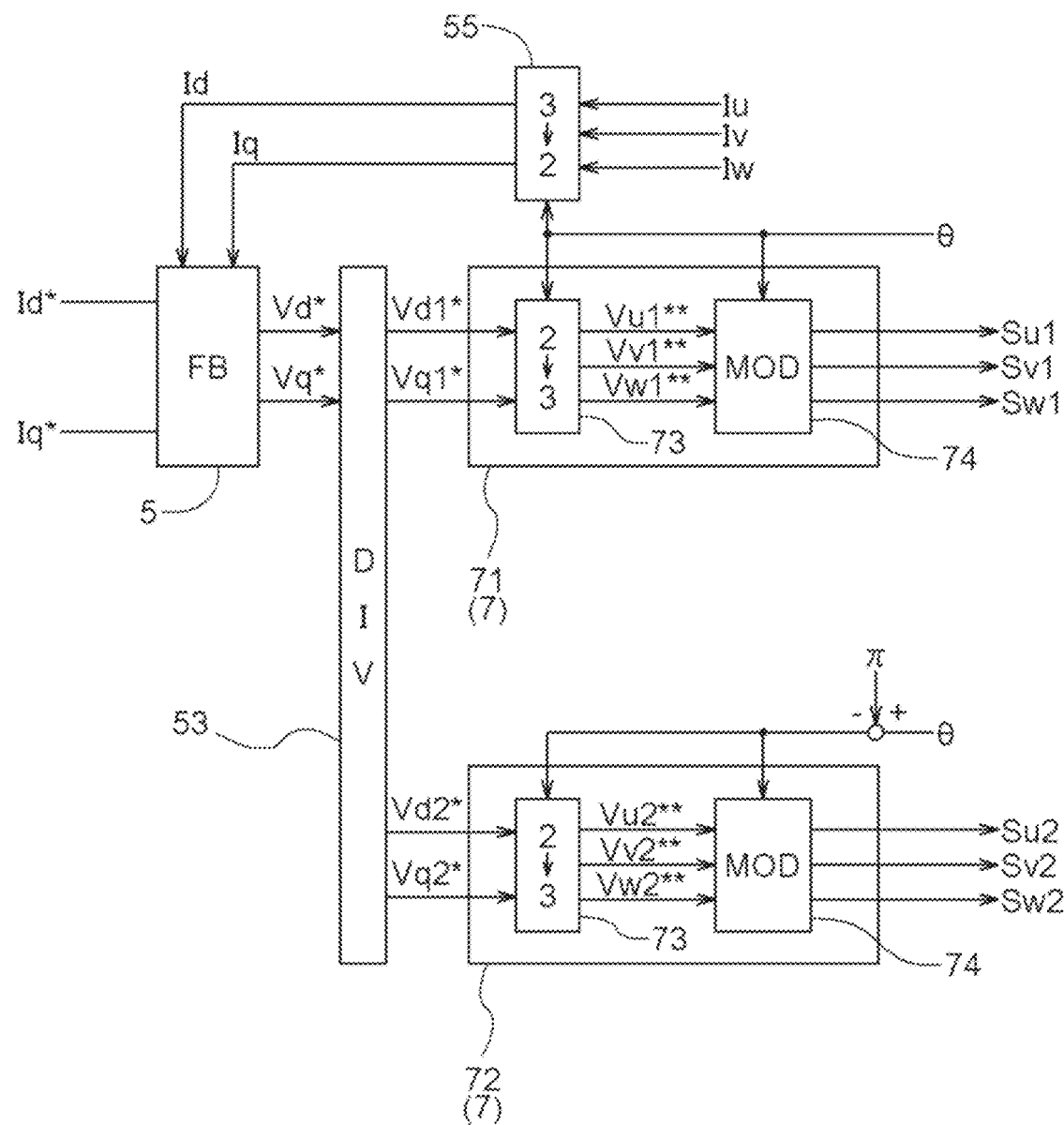
FIG. 2 is a simplified partial block diagram of a rotating electrical machine control device.

A block diagram of FIG. 2 shows some functional parts of the rotating electrical machine control device 1 in a simplified manner. In a vector control method, feedback control is performed by coordinate-transforming actual currents (a U-phase current Iu, a V-phase current Iv, and a W-phase current Iw) flowing through the rotating electrical machine 80 into vector components (a d-axis current Id and a q-axis current Iq) on a d-axis indicating a direction of a magnetic field (magnetic flux) generated by permanent magnets disposed in the rotor of the rotating electrical machine 80 and on a q-axis indicating a direction orthogonal to the d-axis (a direction advanced by an electrical angle of $\pi/2$ relative to the direction of the magnetic field). In the rotating electrical machine control device 1, a three-to-two phase coordinate-transforming part 55 performs coordinate transformation, based on a result of detection ($\theta$: a magnetic pole position and an electrical angle) by the rotation sensor 13.

A current feedback control part 5 (FB) performs feedback control on the rotating electrical machine 80 based on deviation between current instructions (a d-axis current instruction Id* and a q-axis current instruction Iq*) issued based on a torque instruction for the rotating electrical machine 80 and the actual currents (the d-axis current Id and the q-axis current Iq) in a d-q-axis orthogonal vector coordinate system, thereby computing voltage instructions (a d-axis voltage instruction Vd* and a q-axis voltage instruction Vq*). The rotating electrical machine 80 is driven through the two inverters 10, the first inverter 11 and the second inverter 12. Hence, the d-axis voltage instruction Vd* and the q-axis voltage instruction Vq* each are divided, by a dividing part 53 (DIV), into a first d-axis voltage instruction Vd1* and a first q-axis voltage instruction Vq1* for the first inverter 11 and a second d-axis voltage instruction Vd2* and a second q-axis voltage instruction Vq2* for the second inverter 12.

As described above, the rotating electrical machine control device 1 can control the first inverter 11 and the second inverter 12 using control schemes that are independent of each other, and includes two voltage control parts 7 each including a three-phase voltage instruction computing part 73 and a modulating part 74 (MOD). Namely, the rotating electrical machine control device 1 includes a first voltage control part 71 that generates switching control signals (Su1, Sv1, and Sw1) for the respective U-phase, V-phase, and W-phase of the first inverter 11; and a second voltage control part 72 that generates switching control signals (Su2, Sv2, and Sw2) for the respective U-phase, V-phase, and W-phase of the second inverter 12. Though details will be described later, voltage instructions (Vu1, Vv1, and Vw1) for the first inverter 11 and voltage instructions (Vu2, Vv2, and Vw2) for the second inverter 12 differ from each other in phase by "n". Hence, a value obtained by subtracting "n" from a result of detection (θ) by the rotation sensor 13 is inputted to the second voltage control part 72.

Note that as will be described later, modulation schemes include synchronous modulation that is synchronized with rotation of the rotating electrical machine 80; and asynchronous modulation that is independent of rotation of the rotating electrical machine 80. In general, a generation block (a generation flow in a case of software) for switching control signals by synchronous modulation differs from a generation block for switching control signals by asynchronous modulation. The above-described voltage control parts 7 generate switching control signals based on voltage instructions and a carrier that is not synchronized with rotation of the rotating electrical machine 80, but in the present embodiment, for simplification of description, description will be made assuming that switching control signals by synchronous modulation (e.g., switching control signals for a case of rectangular-wave control which will be described later) are also generated by the voltage control parts 7.

Note that as described above, each arm 3A of the inverters 10 includes a series circuit of an upper-stage-side switching element 3H and a lower-stage-side switching element 3L. Though not distinguished in FIG. 2, a switching control signal for each phase is outputted as two types of control signals, an upper-stage switching control signal and a lower-stage switching control signal. For example, a first U-phase switching control signal Su1 for performing switching control on the U-phase of the first inverter 11 is outputted as two signals, a first U-phase upper-stage-side switching control signal Su1+ which is added with "+" at the end and a first U-phase lower-stage-side switching control signal Su1− which is added with "−" at the end. Note that when an upper-stage-side switching element 3H and a lower-stage-side switching element 3L that are included in an arm 3A simultaneously go into on state, the arm 3A goes into a short-circuited state. To prevent this short circuit, there is provided dead time during which both an upper-stage-side switching control signal and a lower-stage-side switching control signal for each arm 3A go into an inactive state. The dead time is also added by the voltage control parts 7.

As shown in FIG. 1, a control terminal (a gate terminal in a case of an IGBT or a FET) of each switching element 3 included in the inverters 10 is connected to the rotating electrical machine control device 1 through a corresponding drive circuit 2 (DRV), and switching control is individually performed on the switching elements 3. High-voltage system circuits (systems connected to the direct-current power supplies 6) for driving the rotating electrical machine 80, such as the inverters 10, and low-voltage system circuits (systems with an operating voltage of about 3.3 volts to 5 volts) such as the rotating electrical machine control device 1 that uses a microcomputer, etc., as a core greatly differ from each other in operating voltage (the power supply voltage of the circuits). The drive circuits 2 increase each of drive capabilities (e.g., capabilities to allow a circuit at a subsequent stage to operate, such as voltage amplitude and output current) of a drive signal (switching control signal) for each switching element 3, and relay the drive signal. A first drive circuit 21 relays switching control signals to the first inverter 11, and a second drive circuit 22 relays switching control signals to the second inverter 12.

As switching pattern modes (modes of voltage waveform control) of the switching elements 3 included in the first inverter 11 and the second inverter 12, the rotating electrical machine control device 1 can perform, for example, two types of control, pulse width modulation (PWM) control in which a plurality of pulses with different patterns are outputted in one cycle of electrical angle, and rectangular-wave control (single-pulse control (1-Pulse)) in which one pulse is outputted in one cycle of electrical angle. Namely, the rotating electrical machine control device 1 can perform pulse width modulation control and rectangular-wave control as control schemes for the first inverter 11 and the second inverter 12. Note that as described above, the rotating electrical machine control device 1 can control the first inverter 11 and the second inverter 12 using control schemes that are independent of each other.

In addition, pulse width modulation has schemes such as continuous pulse width modulation (CPWM: continuous PWM), e.g., sinusoidal pulse width modulation (SPWM: sinusoidal PWM) and space vector pulse width modulation (SVPWM: space vector PWM), and discontinuous pulse width modulation (DPWM: discontinuous PWM). Thus, the pulse width modulation control that can be performed by the rotating electrical machine control device 1 includes, as control schemes, continuous pulse width modulation control and discontinuous pulse width modulation.

The continuous pulse width modulation is a modulation scheme in which pulse width modulation is continuously performed for all of the arms 3A of a plurality of phases, and the discontinuous pulse width modulation is a modulation scheme in which pulse width modulation is performed including a period during which switching elements in an arm(s) 3A of one or more of the plurality of phases are fixed to on state or off state. Specifically, in the discontinuous pulse width modulation, for example, the signal levels of switching control signals for an inverter that correspond to one phase out of three-phase alternating-current electric power are sequentially fixed, and the signal levels of switching control signals corresponding to the other two phases are changed. In the continuous pulse width modulation, all phases are modulated without thus fixing switching control signals corresponding to any of the phases. These modulation schemes are determined based on operating conditions such as rotational speed and torque that are required for the rotating electrical machine 80, and a modulation index (a ratio of the root-mean-square value of line-to-line three-phase alternating-current voltages to a direct-current voltage) required to satisfy the operating conditions.

In the pulse width modulation, pulses are generated based on a magnitude relationship between the amplitude of an alternating-current waveform which is a voltage instruction and the amplitude of a waveform of a triangle wave (including a sawtooth wave) carrier (CA) (see FIGS. 5 to 10). There is also a case in which a PWM waveform is directly generated by digital computation instead of comparison with the carrier, but even in that case, the amplitude of an alternating-current waveform which is an instruction value and the amplitude of a virtual carrier waveform have a correlation.

In pulse width modulation by digital computation, a carrier is determined based on a control cycle of the rotating electrical machine control device 1, e.g., a computation cycle of the microcomputer or a duty cycle of an electronic circuit. That is, even when alternating-current electric power of a plurality of phases is used to drive the alternating-current rotating electrical machine 80, a carrier has a cycle that is not constrained by (a cycle that is not synchronized with) the rotational speed or rotational angle (electrical angle) of the rotating electrical machine 80. Thus, neither the carrier nor each pulse generated based on the carrier is synchronized with the rotation of the rotating electrical machine 80. Thus, modulation schemes such as sinusoidal pulse width modulation and space vector pulse width modulation may be referred to as asynchronous modulation. On the other hand, a modulation scheme in which pulses are generated in synchronization with the rotation of the rotating electrical machine 80 is referred to as synchronous modulation. For example, in rectangular-wave control (rectangular-wave modulation), one pulse is outputted per electrical angle cycle of the rotating electrical machine 80, and thus, the rectangular-wave modulation is synchronous modulation.

As described above, as an index indicating a conversion rate from direct-current voltage to alternating-current voltage, there is a modulation index indicating a ratio of the root-mean-square value of line-to-line alternating-current voltages of a plurality of phases to a direct-current voltage. In general, the maximum modulation index for sinusoidal pulse width modulation is about 0.61 ($\approx$0.612) and the maximum modulation index for space vector pulse width modulation control is about 0.71 ($\approx$0.707). A modulation scheme having a modulation index exceeding about 0.71 is considered to be a modulation scheme whose modulation index is higher than normal, and is referred to as "overmodulation pulse width modulation". The maximum modulation index for the "overmodulation pulse width modulation" is about 0.78. The value "0.78" is a physical (mathematical) limit value for electric power conversion from direct current to alternating current. In the overmodulation pulse width modulation, when the modulation index reaches 0.78, rectangular-wave modulation (single-pulse modulation) in which one pulse is outputted in one cycle of electrical angle is performed. In the rectangular-wave modulation, the modulation index is fixed to about 0.78 which is a physical limit value. Note that the values of modulation indices exemplified here are physical (mathematical) values that do not take into account dead time.

Overmodulation pulse width modulation whose modulation index is less than 0.78 can be implemented by using a principle of any of a synchronous modulation scheme and an asynchronous modulation scheme. A representative modulation scheme for the overmodulation pulse width modulation is discontinuous pulse width modulation. The discontinuous pulse width modulation can be implemented by using a principle of any of a synchronous modulation scheme and an asynchronous modulation scheme. For example, when the synchronous modulation scheme is used, in rectangular-wave modulation, one pulse is outputted in one cycle of electrical angle, whereas in discontinuous pulse width modulation, a plurality of pulses are outputted in one cycle of electrical angle. When there are a plurality of pulses in one cycle of electrical angle, a pulse active period decreases correspondingly, reducing the modulation index. Thus, not only a modulation index that is fixed to about 0.78, but also any modulation index less than 0.78 can be implemented by the synchronous modulation scheme. For example, it is also possible to perform multi-pulse modulation (Multi-Pulses) such as 9-pulse modulation (9-Pulses) in which nine pulses are outputted in one cycle of electrical angle or 5-pulse modulation (5-Pulses) in which five pulses are outputted in one cycle of electrical angle.

In addition, the rotating electrical machine control device 1 can perform shutdown control (SDN) or active short-circuit control (ASC) as fail-safe control performed when an abnormality is detected in an inverter 10 or the rotating electrical machine 80. The shutdown control is control in which an inverter 10 is brought into off state by bringing switching control signals for all switching elements 3 included in the inverter 10 into an inactive state. The active short-circuit control is control in which one side, a set of upper-stage-side switching elements 3H in arms 3A of all of the plurality of phases or a set of lower-stage-side switching elements 3L in the arms 3A of all of the plurality of phases, is brought into on state and the other side is brought into off state. Note that a case in which the upper-stage-side switching elements 3H in the arms 3A of all of the plurality of phases are brought into on state and the lower-stage-side switching elements 3L in the arms 3A of all of the plurality of phases are brought into off state is referred to as upper-stage-side active short-circuit control (ASC-H). Note also that a case in which the lower-stage-side switching elements 3L in the arms 3A of all of the plurality of phases are brought into on state and the upper-stage-side switching elements 3H in the arms 3A of all of the plurality of phases are brought into off state is referred to as lower-stage-side active short-circuit control (ASC-L).

As in the present embodiment, in a case in which the inverters 10 each are connected to each end side of the stator coils 8, when one inverter 10 is short-circuited by active short-circuit control, the stator coils 8 of a plurality of phases are short-circuited in the one inverter 10. That is, the one inverter 10 serves as a neutral point and the stator coils 8 are Y-connected. Hence, the rotating electrical machine control device 1 can implement a mode in which the rotating electrical machine control device 1 controls the open-end winding type rotating electrical machine 80 through the two inverters 10 and a mode in which the rotating electrical machine control device 1 controls the Y-connected rotating electrical machine 80 through one inverter 10 (one of the inverters 10 on which active short-circuit control is not performed).

In addition, when back electromotive force generated by rotation of the rotating electrical machine 80 is large, even if all switching elements 3 are controlled to off state by shutdown control, freewheeling diodes 35 connected in parallel to the switching elements 3 are turned on. This results in a case in which an inverter 10 on which the shutdown control is performed is short-circuited, implementing the Y-connected rotating electrical machine 80.

Figure 3:
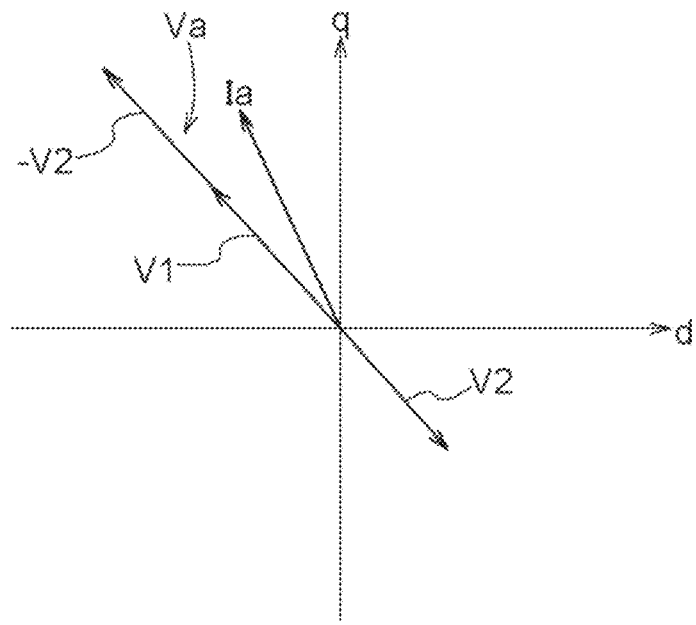
FIG. 3 is a schematic voltage vector diagram of a rotating electrical machine in an orthogonal vector space.

FIG. 3 exemplifies a vector diagram for one operating point of the rotating electrical machine 80 in a d-q-axis vector coordinate system. In the drawing, "V1" represents a first voltage vector indicating the voltage of the first inverter 11 and "V2" represents a second voltage vector indicating the voltage of the second inverter 12. Voltage that appears in the stator coils 8 which are open-end windings through the two inverters 10 corresponds to the difference "V1−V2" between the first voltage vector V1 and the second voltage vector V2. "Va" in the drawing represents a combined voltage vector that appears in the stator coils 8. In addition, "Ia" represents current flowing through the stator coils 8 of the rotating electrical machine 80. As shown in FIG. 3, when the first inverter 11 and the second inverter 12 are controlled such that the vector directions of the first voltage vector V1 and the second voltage vector V2 differ from each other by 180 degrees, the combined voltage vector Va is a vector obtained by adding the magnitude of the second voltage vector V2 to the direction of the first voltage vector V1.

Figure 4:
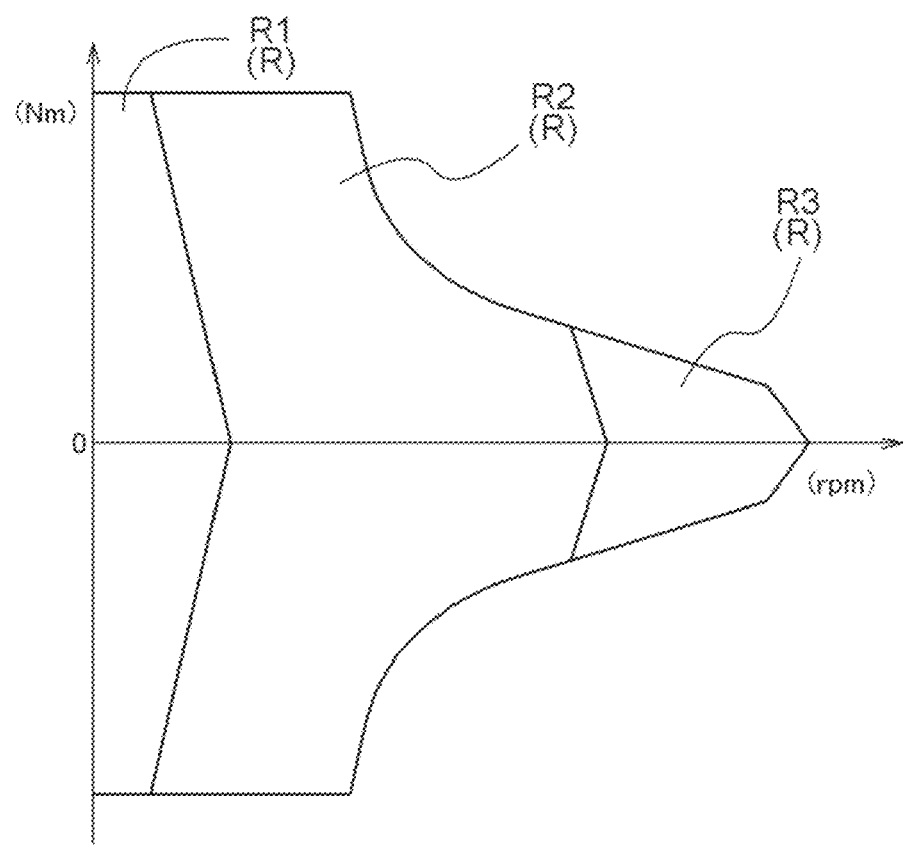
FIG. 4 is a diagram showing an example of control regions of the rotating electrical machine.

In the present embodiment, a plurality of control regions R based on the operating conditions of the rotating electrical machine 80 (see FIG. 4) are set, and the rotating electrical machine control device 1 controls the inverters 10 using control schemes set for each control region R. FIG. 4 shows an example of a relationship between the rotational speed and torque of the rotating electrical machine 80. For example, as shown in FIG. 4, as the control regions R of the rotating electrical machine 80, there are set a first speed region VR1, a second speed region VR2 in which the rotational speed of the rotating electrical machine 80 is higher than that in the first speed region VR1 with the same torque, and a third speed region VR3 in which the rotational speed of the rotating electrical machine 80 is higher than that in the second speed region VR2 with the same torque.

As described above, the rotating electrical machine control device 1 can control each of the first inverter 11 and the second inverter 12 using a plurality of control schemes with different switching patterns. The control schemes include pulse width modulation control (PWM) in which a plurality of pulses with different patterns are outputted in one cycle of electrical angle; and mixed pulse width modulation control (MX-PWM) in which control is performed such that a plurality of pulses with different patterns are outputted during a first period T1 (see FIG. 5, etc.) which is a ½ cycle (half cycle) of electrical angle (full cycle) and an inactive state continues during a second period T2 (see FIG. 5, etc.) which is the other ½ cycle (half cycle) (described later with reference to FIGS. 5 to 8). In the first speed region VR1 and the second speed region VR2, the rotating electrical machine control device 1 controls both inverters, the first inverter 11 and the second inverter 12, by mixed pulse width modulation control.

The mixed pulse width modulation control (MX-PWM) includes mixed continuous pulse width modulation control (MX-CPWM) and mixed discontinuous pulse width modulation control (MX-DPWM). Though details will be described later, in the mixed continuous pulse width modulation control, during a second period T2, control is performed such that an inactive state continues, and during a first period T1, pulse width modulation is continuously performed for all arms 3A of a plurality of phases (described later with reference to FIGS. 5 and 7). Likewise, though details will be described later, in the mixed discontinuous pulse width modulation control, during a second period T2, control is performed such that an inactive state continues, and during a first period T1, pulse width modulation is performed including a period during which switching elements 3 in an arm(s) 3A of one or more of the plurality of phases are fixed to on state or off state (described later with reference to FIGS. 6 and 8).

In the mixed pulse width modulation control, since switching control signals are in an inactive state during the second period T2, too, loss in the inverters 10 decreases, and harmonic current resulting from switching also decreases, also reducing loss (iron loss) in the rotating electrical machine 80. That is, by performing the mixed pulse width modulation control, system loss can be reduced.

For example, as shown in the following table 1, in the first speed region VR1, the rotating electrical machine control device 1 controls both inverters 10, the first inverter 11 and the second inverter 12, by mixed continuous pulse width modulation control (MX-CPWM) which will be described later. In addition, in the second speed region VR2, the rotating electrical machine control device 1 controls both inverters 10, the first inverter 11 and the second inverter 12, by mixed discontinuous pulse width modulation control (MX-DPWM) which will be described later. In addition, in the third speed region VR3, the rotating electrical machine control device 1 controls both inverters 10, the first inverter 11 and the second inverter 12, by rectangular-wave control. Mi_sys, Mi_inv1, and Mi_inv2 in the table will be described later.

TABLE 1

| R | Mi_sys | INV1 | Mi_inv1 | INV2 | Mi_inv2 |
|---|---|---|---|---|---|
| VR1 | M < a | MX-CPWM | M < a | MX-CPWM | M < a |
| VR2 | a ≤ M < 0.78 | MX - PWM | a ≤ M < 0.78 | MX - DPWM | a ≤ M < 0.78 |
| VR3 | M = 0.78 | 1 - Pulse | M = 0.78 | 1 - Pulse | M = 0.78 |

It is preferred that boundaries between the control regions R (boundaries between the first speed region VR1, the second speed region VR2, and the third speed region VR3) be set based on at least either one of the rotational speed of the rotating electrical machine 80 based on the torque of the rotating electrical machine 80 and a ratio of the root-mean-square value of line-to-line alternating-current voltages of a plurality of phases to a direct-current voltage (which may be an instruction value or may be an equivalent from an output voltage).

As exemplified in FIG. 4, the operating conditions of the rotating electrical machine 80 are often defined by a relationship between rotational speed and torque. The control regions R may be set based on rotational speed which is one parameter. Here, the rotational speed that defines boundaries between the control regions R can be set to be constant regardless of torque, but it is further preferred that the rotational speed that defines boundaries between the control regions R be set to a value that varies depending on the torque. By doing so, drive of the rotating electrical machine 80 can be controlled with high efficiency, based on the operating conditions of the rotating electrical machine 80.

In addition, for example, when the rotating electrical machine 80 requires high output (high rotational speed or high torque), a voltage-type inverter implements the requirement by increasing direct-current voltage or increasing a rate at which direct-current voltage is converted into alternating-current voltage. When direct-current voltage is constant, by increasing a rate at which the direct-current voltage is converted into alternating-current voltage, the requirement can be implemented. The rate can be represented as a ratio of the root-mean-square value of three-phase alternating-current electric power to direct-current electric power (in a case of a voltage-type inverter, it is equivalent to a ratio of the root-mean-square value of three-phase alternating-current voltages to a direct-current voltage). As described above, control schemes for controlling the inverters 10 include various schemes from a scheme in which the ratio is low to a scheme in which the ratio is high.

As shown in table 1, when the control regions R are set based on the ratio of the root-mean-square value of three-phase alternating-current electric power to direct-current electric power (modulation index) which is determined based on a requirement for the rotating electrical machine 80, drive of the rotating electrical machine 80 can be controlled with high efficiency, based on the operating conditions of the rotating electrical machine 80. Note that in the table, "Vi_inv1" represents the modulation index of the first inverter 11, "Mi_inv2" represents the modulation index of the second inverter 12, and "Mi_sys" represents the modulation index of the entire system.

The above-described table 1 exemplifies modulation indices for each control region R. In the present embodiment, a terminal-to-terminal voltage "E1" of the first direct-current power supply 61 and a terminal-to-terminal voltage "E2" of the second direct-current power supply 62 are identical (both are voltages "E"). When the root-mean-square value on the alternating-current side of the first inverter 11 is "Va_inv1" and the root-mean-square value on the alternating-current side of the second inverter 12 is "Va_inv2", the modulation index "Mi_inv1" of the first inverter 11 and the modulation index "Mi_inv2" of the second inverter 12 are as shown in the following equations (1) and (2). In addition, the modulation index "Mi_sys" of the entire system is as shown in the following equation (3).

$$Mi\_inv1 = Va\_inv1/E1 = Va\_inv1/E \quad (1)$$

$$Mi\_inv2 = Va\_inv2/E2 = Va\_inv2/E \quad (2)$$

$$Mi\_sys = (Va\_inv1 + Va\_inv2)/(E1 + E2) \quad (3)$$

$$= (Va\_inv1 + Va\_inv2)/2E$$

For the instantaneous value of voltage, an instantaneous vector needs to be considered, but when only the modulation index is simply considered, the modulation index "Mi_sys" of the entire system is "(Mi_inv1+Mi_inv2)/2" from equations (1) to (3). Note that table 1 shows, as rated values, modulation indices for each control region R. Hence, upon actual control, taking into account hunting occurring when a control scheme changes between the control regions R, etc., modulation indices for each control region R may include an overlapping range.

Note that the modulation index "a" shown in table 1 and the modulation index "b" shown in table 2 which will be described later are set based on a theoretical upper limit value of a modulation index for each modulation scheme, and further taking into account dead time. For example, "a" is about 0.5 to 0.6, and "b" is about 0.25 to 0.3.

Figure 5:
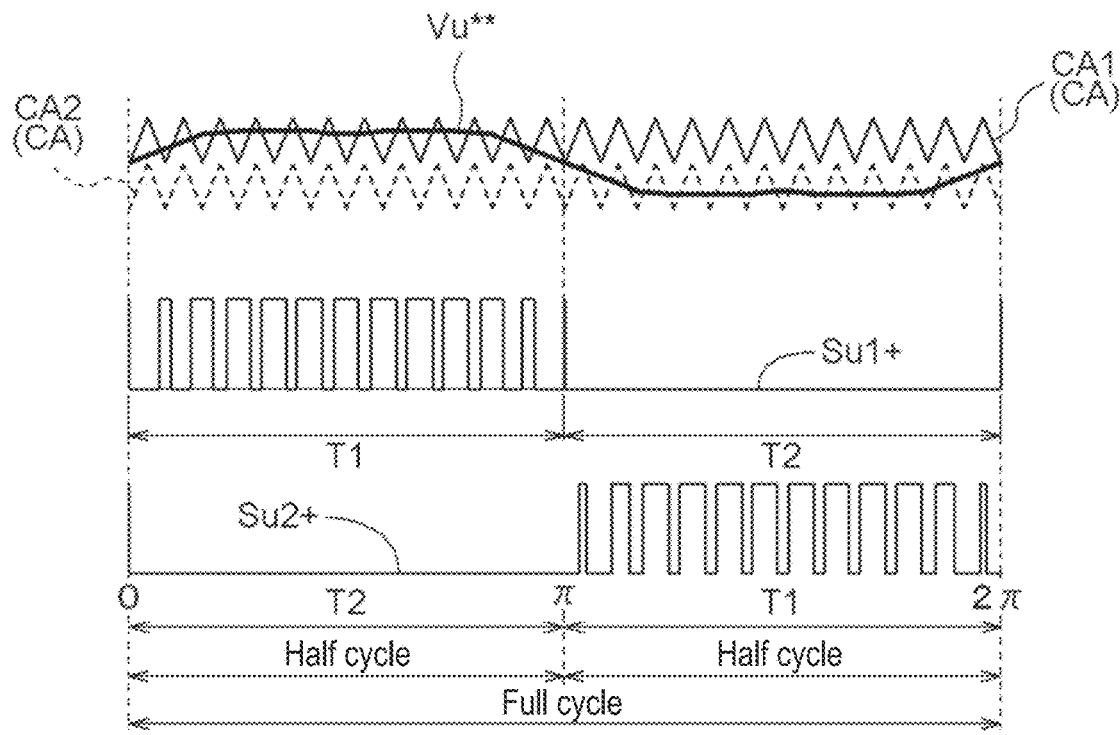
FIG. 5 is a waveform diagram showing an example of a voltage instruction and switching control signals for mixed continuous pulse width modulation (half-cycle continuous pulses).
Figure 7:
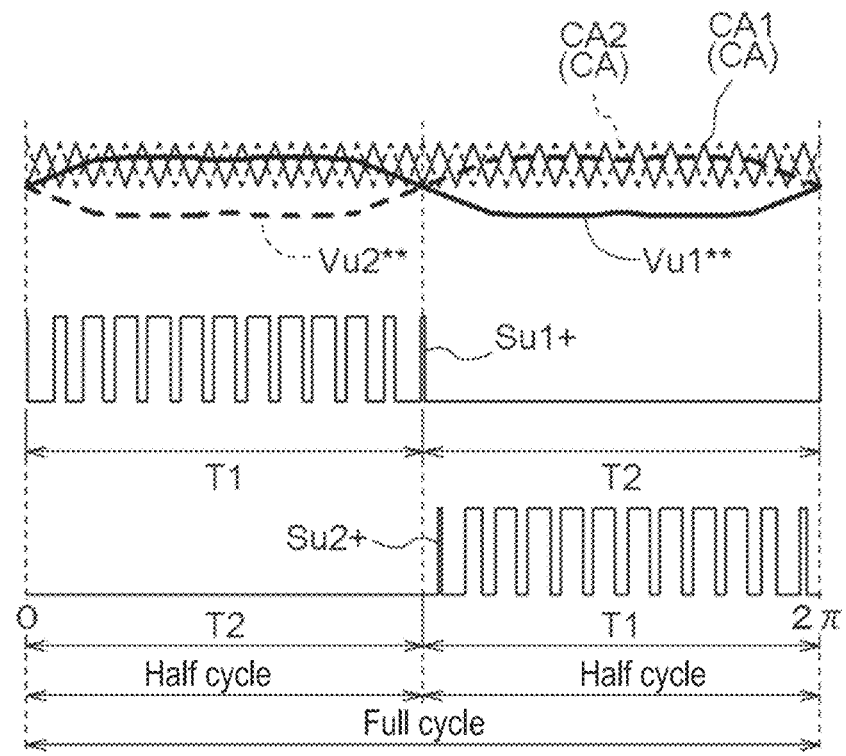
FIG. 7 is a waveform diagram showing another example of voltage instructions and switching control signals for mixed continuous pulse width modulation (half-cycle continuous pulses).
Figure 8:
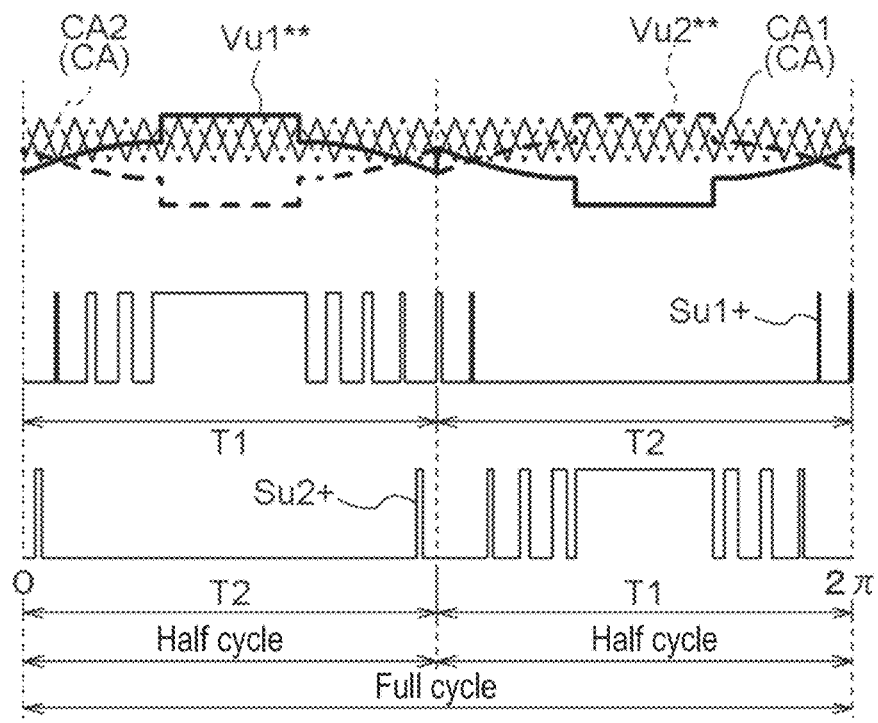
FIG. 8 is a waveform diagram showing another example of voltage instructions and switching control signals for mixed discontinuous pulse width modulation (half-cycle discontinuous pulses).

Now, with reference to FIGS. 5 to 8, mixed pulse width modulation control (MX-PWM) will be described by showing exemplary waveforms of U-phase voltage instructions (Vu1 and Vu2) and U-phase upper-stage-side switching control signals (Su1+ and Su2+). Note that depiction of a second U-phase lower-stage-side switching control signal Su2− and the V-phase and the W-phase is omitted. FIGS. 5 and 7 show exemplary waveforms for mixed continuous pulse width modulation control (MX-CPWM) and FIGS. 6 and 8 show exemplary waveforms for mixed discontinuous pulse width modulation control (MX-DPWM).

Figure 6:
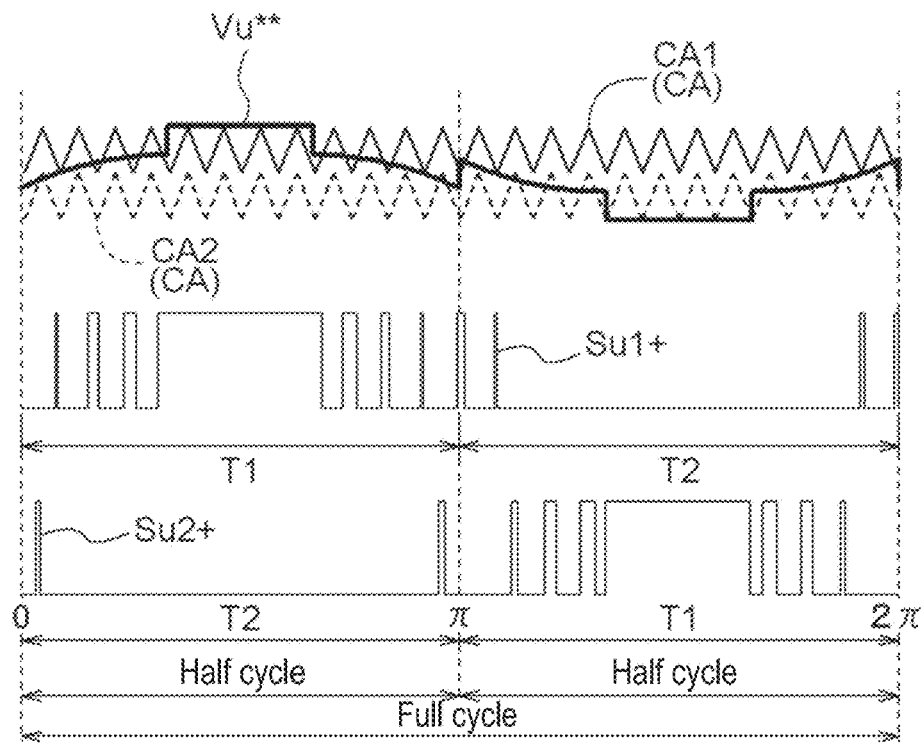
FIG. 6 is a waveform diagram showing an example of a voltage instruction and switching control signals for mixed discontinuous pulse width modulation (half-cycle discontinuous pulses).

FIGS. 5 and 6 show examples of a first carrier CA1 which is a carrier CA for the first inverter 11, a second carrier CA2 which is a carrier CA for the second inverter 12, a common U-phase voltage instruction Vu** which is a U-phase voltage instruction common to the first inverter 11 and the second inverter 12, a first U-phase upper-stage-side switching control signal Su1+, and a second U-phase upper-stage-side switching control signal Su2+. Depiction of a first U-phase lower-stage-side switching control signal Su1−, a second U-phase lower-stage-side switching control signal Su2−, and the V-phase and the W-phase is omitted (the same also applies to other control schemes).

For example, the first carrier CA1 can change between "0.5<CA1<1", the second carrier CA2 can change between "0<CA2<0.5", and the voltage instruction (V) can change between "0≤V≤1". A carrier CA (the first carrier CA1 and the second carrier CA2) is compared with a voltage instruction (V), and when the voltage instruction is greater than or equal to the carrier CA, a switching control signal is "1", and when the voltage instruction is less than the carrier CA, the switching control signal is "0". Comparative logic between the carrier CA and the voltage instruction (V) is also the same in the following description.

As shown in FIGS. 5 and 6, the amplitudes of the first carrier CA1 and the second carrier CA2 are half of an amplitude allowed for the voltage instruction (V). In general pulse width modulation, the amplitude of the carrier CA is equal to an amplitude allowed for a voltage instruction, and the carrier CA for mixed pulse width modulation can be referred to as half carrier. By using such a half carrier, during a first period T1 (half cycle) which is a ½ cycle of electrical angle (full cycle), such a half carrier crosses the voltage instruction (V), and thus, a plurality of pulses with different patterns are outputted as a switching control signal. During a second period T2 (half cycle) which is the other ½ cycle, the half carrier does not cross the voltage instruction (V**), and thus, the switching control signal is outputted such that an inactive state continues.

Note that in mixed discontinuous pulse width modulation control, as shown in FIG. 6, during the second period T2, too, pulses that are partially in an active state are outputted as a switching control signal. This results from the fact that the modulation index for discontinuous pulse width modulation which serves as the basis is large compared to that for continuous pulse width modulation. Points where the pulses in an active state are outputted during the second period T2 are near the center of the amplitude of the voltage instruction (V) and in the neighborhood of inflection points of the voltage instruction (V). As shown in FIG. 6, it can be said that in the mixed discontinuous pulse width modulation control, too, an inactive state is continuously outputted during the second period T2. In addition, when the second period T2 is only a period during which the switching control signal is in an inactive state (a period less than a ½ cycle), and is set to a period in one cycle other than the second period T2 (a period greater than or equal to a ½ cycle), mixed pulse width modulation can also be defined as follows. It can also be said that in the mixed pulse width modulation control, control is performed such that a plurality of pulses with different patterns are outputted during the first period T1 which is a ½ cycle or more of electrical angle, and an inactive state continues during the second period T2 which is the other period of one cycle of electrical angle.

FIGS. 7 and 8 exemplify a different mode of mixed continuous pulse width modulation control and mixed discontinuous pulse width modulation control than that in FIGS. 5 and 6. Switching control signals to be generated are the same. FIGS. 7 and 8 show examples of a first carrier CA1 which is a carrier CA for the first inverter 11, a second carrier CA2 which is a carrier CA for the second inverter 12, a first U-phase voltage instruction Vu1 which is a U-phase voltage instruction for the first inverter 11, a second U-phase voltage instruction Vu2 which is a U-phase voltage instruction for the second inverter 12, a first U-phase upper-stage-side switching control signal Su1+, and a second U-phase upper-stage-side switching control signal Su2+. For example, the first carrier CA1 and the second carrier CA2 can change between "0.5<CA1<1" and voltage instructions (V) can change between "0≤V≤1". The first carrier CA1 and the second carrier CA2 differ from each other in phase by 180 degrees (π). In addition, the first U-phase voltage instruction Vu1 and the second U-phase voltage instruction Vu2 also differ from each other in phase by 180 degrees (π).

As shown in FIGS. 7 and 8, the amplitudes of the first carrier CA1 and the second carrier CA2 are half of an amplitude allowed for the voltage instructions (V). Thus, carriers CA in the mode shown in FIGS. 7 and 8 each are also a half carrier. By using such a half carrier, during a first period T1 which is a ½ cycle (or a ½ cycle or more) of electrical angle, such a half carrier crosses a voltage instruction (V), and thus, a plurality of pulses with different patterns are outputted as a switching control signal. During a second period T2 which is the other period of the cycle, the half carrier does not cross the voltage instruction (V**), and thus, the switching control signal is outputted such that an inactive state continues.

The mode exemplified in FIGS. 5 and 6 is a scheme in which modulation is performed using two half carriers and one common reference voltage instruction (V), and thus can be said to be a double half-carrier and single reference scheme. On the other hand, the mode exemplified in FIGS. 7 and 8 is a scheme in which modulation is performed using two half carriers and two voltage instructions (V), and thus can be said to be a double half-carrier and double reference scheme.

As described above with reference to FIGS. 5 to 8, in the mixed pulse width modulation control, a plurality of pulses are generated based on a half carrier (the first carrier CA1 and the second carrier CA2) which is a carrier CA with the ½ wave height of a variable range of an instruction value (a voltage instruction; in the above-described examples, the U-phase voltage instruction (Vu (Vu=Vu1=Vu2), Vu1, and Vu2)), and the instruction value. In the present embodiment, as schemes for the mixed pulse width modulation control, two schemes are exemplified: the double half-carrier and single reference scheme and the double half-carrier and double reference scheme.

In the double half-carrier and single reference scheme, as described with reference to FIGS. 5 and 6, pulses for the first inverter 11 are generated based on a first half carrier (the first carrier CA1) that is set, as a half carrier, on one of a higher voltage side and a lower voltage side (here, the higher voltage side) than the center of the amplitude of an instruction value (the common U-phase voltage instruction Vu), and the instruction value (the common U-phase voltage instruction Vu) common to the first inverter 11 and the second inverter 12. In addition, in this scheme, pulses for the second inverter 12 are generated based on a second half carrier (the second carrier CA2) that has the same phase as the first half carrier (the first carrier CA1) and that is set on the other one of the higher voltage side and the lower voltage side (here, the lower voltage side) than the center of the amplitude of the instruction value (the common U-phase voltage instruction Vu), and the instruction value (the common U-phase voltage instruction Vu).

In the double half-carrier and double reference scheme, as described with reference to FIGS. 7 and 8, pulses for the first inverter 11 are generated based on a first half carrier (the first carrier CA1) that is set, as a half carrier, on one of a higher voltage side and a lower voltage side (here, the higher voltage side) than the centers of the amplitudes of instruction values (the first U-phase voltage instruction Vu1 and the second U-phase voltage instruction Vu2), and a first instruction value for the first inverter 11 (the first U-phase voltage instruction Vu1). In addition, in this scheme, pulses for the second inverter 12 are generated based on a second half carrier (the second carrier CA2) that differs in phase by 180 degrees from the first half carrier (the first carrier CA1) and that is set on the same side (the higher voltage side) as the first half carrier (the first carrier CA1), and a second instruction value for the second inverter 12 (the second U-phase voltage instruction Vu2) that differs in phase by 180 degrees from the first instruction value (the first U-phase voltage instruction Vu1**).

Figure 9:
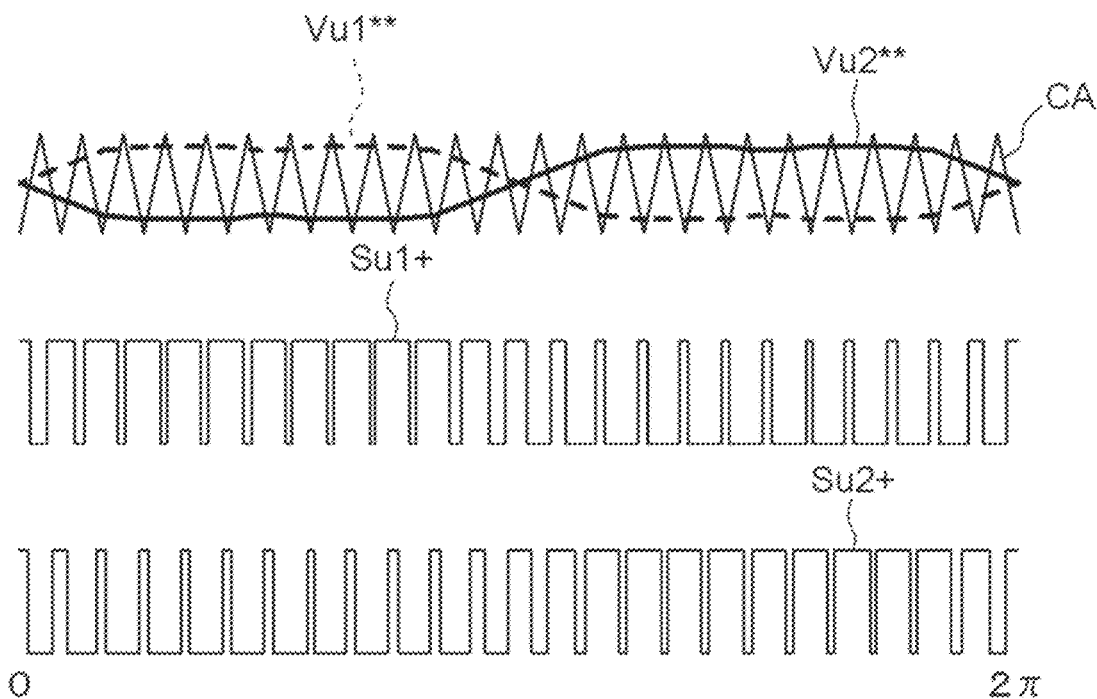
FIG. 9 is a waveform diagram showing an example of voltage instructions and switching control signals for continuous pulse width modulation.
Figure 10:
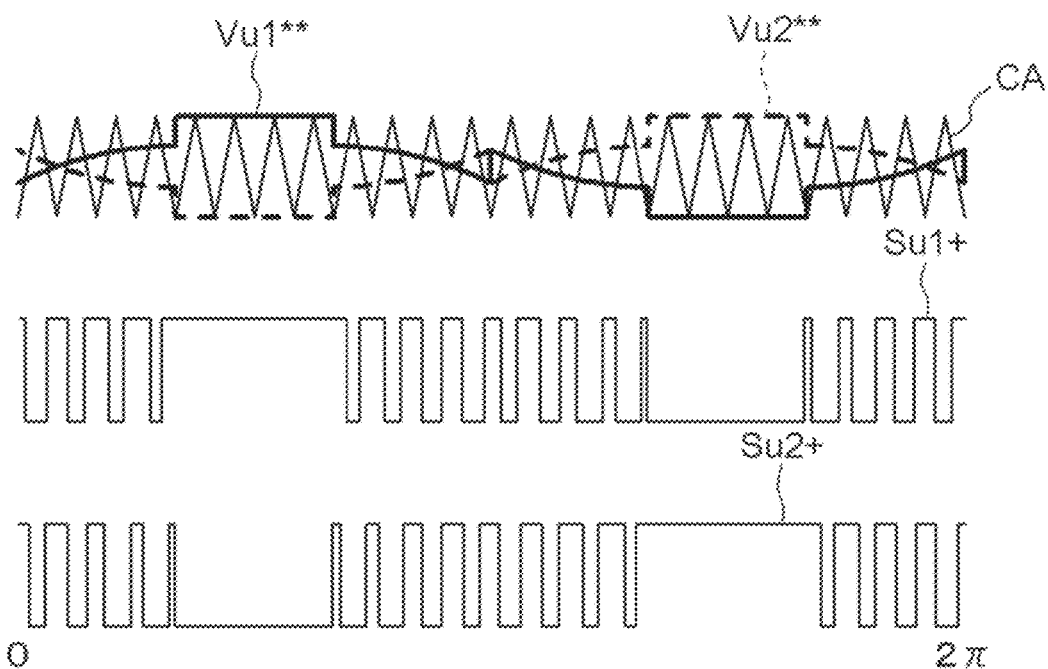
FIG. 10 is a waveform diagram showing an example of voltage instructions and switching control signals for discontinuous pulse width modulation.

Note that as will be described later with reference to table 2, in the first speed region VR1 and the second speed region VR2, the inverters 10 may be controlled by pulse width modulation instead of mixed pulse width modulation. FIG. 9 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for a case in which in the first speed region VR1, both the first inverter 11 and the second inverter 12 are controlled by continuous pulse width modulation control. In addition, FIG. 10 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for a case in which in the second speed region VR2, both the first inverter 11 and the second inverter 12 are controlled by discontinuous pulse width modulation control.

When switching control is performed on both the first inverter 11 and the second inverter 12, the first U-phase voltage instruction Vu1 and the second U-phase voltage instruction Vu2 have phases different from each other by approximately 180 degrees. For example, the maximum amplitude of U-phase voltage is "(4/3)E" and the maximum amplitude of line-to-line voltage is "2E" (see also the vector diagram of FIG. 3). Note that the first direct-current power supply 61 and the second direct-current power supply 62 are independent of each other, and a first voltage E1 of the first direct-current power supply 61 and a second voltage E2 of the second direct-current power supply 62 may have different values. For example, to be precise, the maximum amplitude of U-phase voltage is "(⅔)E1+(⅔)E2", but for easy understanding, in this specification, "E1=E2=E". To the rotating electrical machine 80 is supplied equal electric power from the two inverters 10. At this time, identical voltage instructions (V**) with phases different from each other by 180 degrees (π) are provided to both inverters 10.

Meanwhile, when switching control is performed on the inverters 10, ripple components superimposed on an alternating-current fundamental may generate noise in an audio frequency band. When the two inverters 10 are controlled by pulses having different modes, a ripple based on each pulse occurs, which may increase noise in the audio frequency band. Particularly, when the rotational speed of the rotating electrical machine 80 is low, the possibility of inclusion of the frequency of ripple components (or sideband frequencies thereof) in the audio frequency band increases. It is desirable to appropriately set control schemes for the rotating electrical machine 80, i.e., control schemes for the inverters 10, based on operating conditions so that both of operation with high system efficiency and a reduction in audible noise can be achieved.

The rotating electrical machine control device 1 of the present embodiment has, as control modes of the rotating electrical machine 80, a loss reduction priority mode (efficiency priority mode) and a noise reduction priority mode in a switchable manner. In the loss reduction priority mode, as described above with reference to table 1, the rotating electrical machine control device 1 performs switching control on the inverters 10 using mixed pulse width modulation control. In the noise reduction priority mode, as exemplified in the following table 2, the rotating electrical machine control device 1 performs switching control on the inverters 10 using pulse width modulation control.

TABLE 2

| R | $Mi\_sys$ | INV1 | $Mi\_inv1$ | INV2 | $Mi\_inv2$ |
|---|---|---|---|---|---|
| VR1 | M < b | CPWM | M < b | CPWM | M < b |
| VR2-2 | b ≤ M < 0.78 | DPWM | b ≤ M < 0.78 | DPWM | b ≤ M < 0.78 |
| VR3 | M = 0.78 | 1-Pulse | M = 0.78 | 1-Pulse | M = 0.78 |

When switching control is performed on the inverters 10, ripple components superimposed on an alternating-current fundamental may generate noise in the audio frequency band. Particularly, when the rotational speed of the rotating electrical machine 80 is low, the possibility of inclusion of the frequency of ripple components (or sideband frequencies thereof) in the audio frequency band increases. In mixed pulse width modulation, as shown in FIGS. 5 to 8, during a half cycle of electrical angle, the two inverters 10 are controlled using different modes of pulses, and thus, a ripple based on each pulse occurs, and there is a possibility of increase in noise in the audio frequency band. In the first speed region VR1 and the second speed region VR2 in which the rotational speed of the rotating electrical machine 80 is relatively low, sound associated with travel of the vehicle (traveling sound such as sound of tires contacting a road surface) is also small, and thus, when noise outputted from one inverter 10 to be driven is noise in the audio frequency band, there is a possibility that the noise is likely to be audible to a user.

For example, it is preferred that upon the start of the vehicle or upon deceleration to make a stop, taking into account the fact that noise in the audio frequency band is likely to be audible to the user, the noise reduction priority mode be selected, and upon steady-state driving where the vehicle travels in a steady state, the loss reduction priority mode be selected. Note that these modes may be selected by a user's operation (a setting switch (also including input from a touch panel, etc.)).

In the noise reduction priority mode, in the first speed region VR1 and the second speed region VR2 in which the rotational speed of the rotating electrical machine 80 is relatively low, the first inverter 11 and the second inverter 12 are controlled by pulse width modulation control instead of mixed pulse width modulation control. In the two inverters 10 that allow currents to flow through the stator coils 8, the phases of the currents differ from each other by substantially 180 degrees, and thus, the phases of the currents including ripple components differ from each other by substantially 180 degrees. Thus, at least some of the ripple components can cancel each other out, enabling a reduction in noise in the audio frequency band.

Meanwhile, as described above, the smoothing capacitor 4 for smoothing direct-current voltage is connected to the direct-current side of the inverter 10 that converts electric power between direct current and alternating current. When some kind of failure has occurred in the smoothing capacitor 4, the capacitance of the smoothing capacitor 4 may decrease or the resistance of the smoothing capacitor 4 may become very small. As described above, in the present embodiment, as shown in FIG. 1, each smoothing capacitor 4 includes a plurality of capacitor cells 4C connected in parallel to each other. For example, when an open-circuit failure has occurred in which one or more of the plurality of capacitor cells 4C go into an open-circuit state, the capacitance of the smoothing capacitor 4 including these capacitor cells 4C decreases. When the capacitance of the smoothing capacitor 4 decreases, ripples in direct current increase and electric charge to be stored decreases, and thus, a direct-current link voltage Vdc is likely to increase. In addition, when a short-circuit failure has occurred in which at least one of the plurality of capacitor cells 4C goes into a short-circuited state, the positive polarity P and the negative polarity FG on the direct-current side of the inverter 10 are short-circuited.

In the present embodiment, when a failure has occurred in either one of the smoothing capacitors 4, the first smoothing capacitor 41 or the second smoothing capacitor 42, the failed smoothing capacitor 4 is identified, and appropriate fail-safe control is performed. Then, the rotating electrical machine 80 is driven through at least either one of the first inverter 11 and the second inverter 12.

As described above, the rotating electrical machine control system 100 that controls drive of the rotating electrical machine 80 having open-end windings (the stator coils 8) of a plurality of phases that are independent of each other includes the first inverter 11 connected to the one-end side of the open-end windings; the second inverter 12 connected to the other-end side of the open-end windings; the first direct-current power supply 61 to which the first inverter 11 is connected; the second direct-current power supply 62 to which the second inverter 12 is connected; the first smoothing capacitor 41 connected in parallel to the first direct-current power supply 61; the second smoothing capacitor 42 connected in parallel to the second direct-current power supply 62; and the rotating electrical machine control device 1 that can control the first inverter 11 and the second inverter 12 independently of each other. When a difference between a first wave height value Ibpp1 which is the wave height value of a current (first battery current Ib1) flowing through the first direct-current power supply 61 and a second wave height value Ibpp2 which is the wave height value of a current (first battery current Ib1) flowing through the second direct-current power supply 62 is greater than or equal to a predefined determination threshold value (difference threshold value Idiff_ref) and the first wave height value Ibpp1 is larger than the second wave height value Ibpp2, the rotating electrical machine control device 1 determines that the first smoothing capacitor 41 has an open-circuit failure, and when the difference between the first wave height value Ibpp1 and the second wave height value Ibpp2 is larger than or equal to the determination threshold value (difference threshold value Idiff_ref) and the second wave height value Ibpp2 is larger than the first wave height value Ibpp1, the rotating electrical machine control device 1 determines that the second smoothing capacitor 42 has an open-circuit failure.

Note that though details will be described later, the determination threshold value (difference threshold value Idiff_ref) is set to a value based on a difference between the wave height value (Ibpp) of a current (battery current Ib) flowing through a direct-current power supply 6 connected to a smoothing capacitor 4 having caused an open-circuit failure and the wave height value of a current (battery current Ib) flowing through a direct-current power supply 6 connected to a normal smoothing capacitor 4 during output of defined torque which is more than half of maximum torque that can be outputted from the rotating electrical machine 80, the smoothing capacitor 4 and the normal smoothing capacitor 4 each being one of the first smoothing capacitor 41 and the second smoothing capacitor 42.

In addition, the rotating electrical machine control system 100 includes, as described above, the first contactor 91 that establishes and cuts off an electrical connection between the first direct-current power supply 61, and the first smoothing capacitor 41 and the first inverter 11; and the second contactor 92 that establishes and cuts off an electrical connection between the second direct-current power supply 62, and the second smoothing capacitor 42 and the second inverter 12. The first contactor 91 is opened when a current (first battery current Ib1) flowing through the first direct-current power supply 61 is greater than or equal to a predefined overcurrent threshold value, and the second contactor 92 is opened when a current (second battery current Ib2) flowing through the second direct-current power supply 62 is greater than or equal to the overcurrent threshold value. For example, open/close control is performed on the first contactor 91 based on the first battery current Ib1 and performed on the second contactor 92 based on the second battery current Ib2 by the rotating electrical machine control device 1. In addition, when a voltage (first direct-current link voltage Vdc1) at both ends of the first smoothing capacitor 41 is less than or equal to a predefined voltage for a short circuit Vshrt_ref and a current (first battery current Ib1) flowing through the first direct-current power supply 61 is less than or equal to a predefined current for a short circuit Ishrt_ref, the rotating electrical machine control device 1 determines that the first smoothing capacitor 41 has a short-circuit failure. In addition, the rotating electrical machine control device 1 is opened when a voltage (second direct-current link voltage Vdc2) at both ends of the second smoothing capacitor 42 is less than or equal to the voltage for a short circuit Vshrt_ref and a current (second battery current Ib2) flowing through the second direct-current power supply 62 is greater than or equal to the overcurrent threshold value (OC_ref). For example, the first contactor 91 is based on the first battery current Ib1, and when (the second battery current Ib2) is less than or equal to the current for a short circuit Ishrt_ref, the second contactor 92 determines that the second smoothing capacitor 42 has a short-circuit failure.

Figure 11:
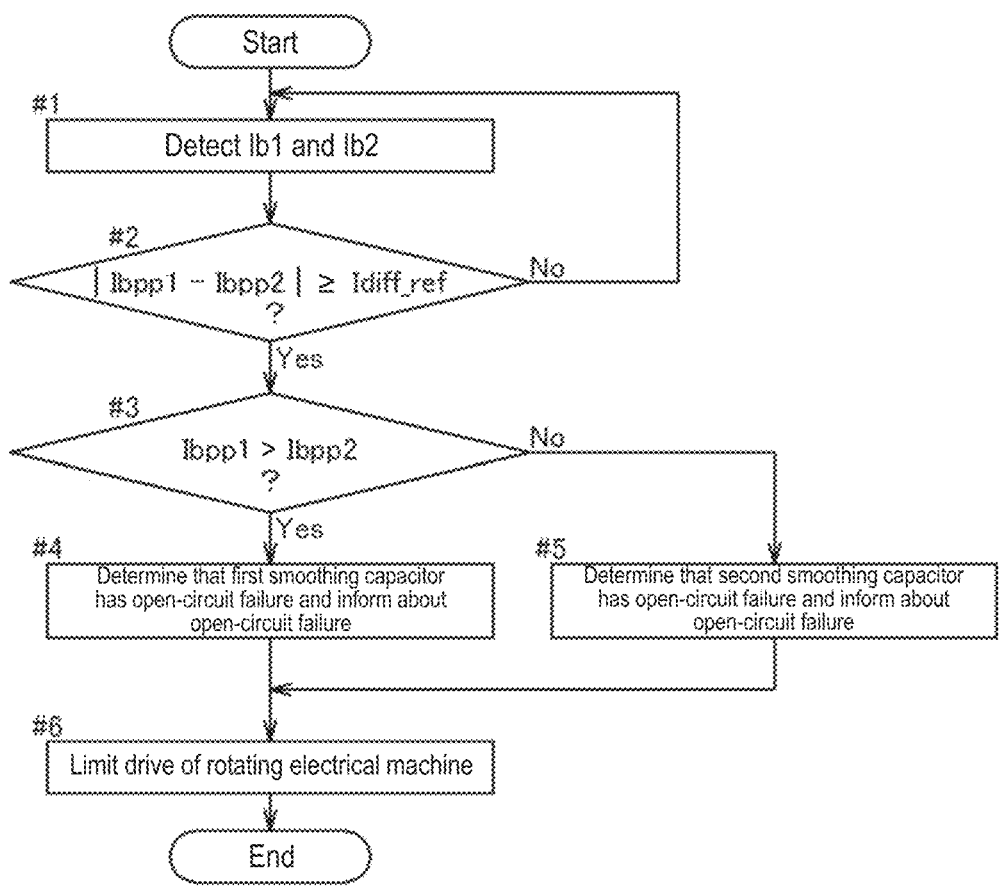
FIG. 11 is a flowchart showing an example of detection of an open-circuit failure of a smoothing capacitor and fail-safe control.
Figure 12:
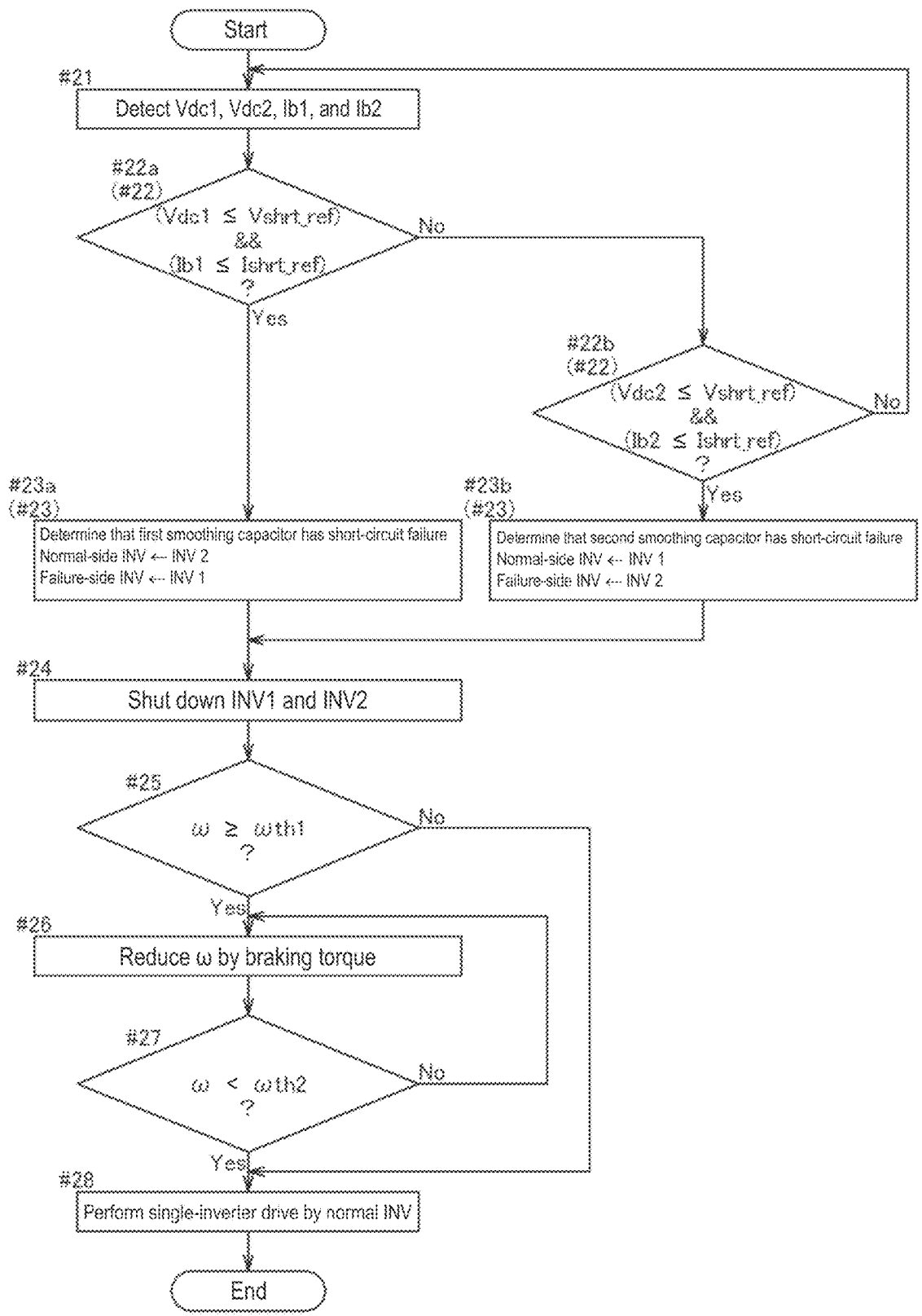
FIG. 12 is a flowchart showing an example of detection of a short-circuit failure of a smoothing capacitor and fail-safe control.

Fail-safe control performed when an open-circuit failure or a short-circuit failure has occurred in a smoothing capacitor 4 will be specifically described below. A flowchart of FIG. 11 shows an example of detection of an open-circuit failure of a smoothing capacitor 4 and fail-safe control, and FIG. 12 shows an example of detection of a short-circuit failure of a smoothing capacitor 4 and fail-safe control.

First, with reference to FIG. 11, processes performed upon an open-circuit failure will be described. As shown in FIG. 11, the rotating electrical machine control device 1 first detects a first battery current Ib1 and a second battery current Ib2 (#1). The first battery current Ib1 and the second battery current Ib2 (collectively referred to as battery currents Ib) each are detected by being measured by a current sensor which is not shown in FIG. 1, etc., and obtained by the rotating electrical machine control device 1 through an in-vehicle network, e.g., a controller area network (CAN). The rotating electrical machine control device 1 detects the first battery current Ib1 and the second battery current Ib2 based on a control cycle of vector control. When a detection period is long, resolution decreases, and when the detection period is too short, the capacity of a temporary storage device such as a memory is consumed and a computing load increases. Thus, it is preferred that the first battery current Ib1 and the second battery current Ib2 be detected, for example, once every control cycle of vector control.

The rotating electrical machine control device 1 computes the wave height values (peak-to-peak) of the detected battery currents Ib, and further computes a difference (absolute value) between the wave height value (first wave height value Ibpp1) of the first battery current Ib1 and the wave height value (second wave height value Ibpp2) of the second battery current Ib2.

Then, the rotating electrical machine control device 1 determines whether the difference is greater than or equal to a difference threshold value Idiff_ref (determination threshold value) (#2). If the difference is greater than or equal to the difference threshold value Idiff_ref, there is a possibility that there may be a difference between a ripple in the first battery current Ib1 and a ripple in the second battery current Ib2 and the capacitance of either one of the first smoothing capacitor 41 and the second smoothing capacitor 42 may be reduced, i.e., an open-circuit failure may have occurred in a smoothing capacitor 4. Thus, when the difference is greater than or equal to the difference threshold value Idiff_ref (determination threshold value), the rotating electrical machine control device 1 determines which one of the first wave height value Ibpp1 and the second wave height value Ibpp2 is larger (#3).

When the first wave height value Ibpp1 is larger than the second wave height value Ibpp2, the rotating electrical machine control device 1 determines that an open-circuit failure has occurred in the first smoothing capacitor 41, and informs a vehicle's occupant that the first smoothing capacitor 41 has a failure (#5). For example, an alert light in the interior of the vehicle is turned on or a message is displayed on a display panel. In addition, in a case of being able to connect to a network outside the vehicle, failure information may be transmitted to a service garage, a roadside assistance company, an occupant's smartphone, etc. Likewise, when the second wave height value Ibpp2 is larger than the first wave height value Ibpp1, the rotating electrical machine control device 1 determines that an open-circuit failure has occurred in the second smoothing capacitor 42, and informs the vehicle's occupant that the second smoothing capacitor 42 has a failure (#5).

When an open-circuit failure has occurred in a smoothing capacitor 4 and the capacitance of the smoothing capacitor 4 is smaller than the rated capacitance, as described above, ripples in direct current increase and electric charge to be stored decreases, and thus, a direct-current link voltage Vdc is likely to increase. However, for example, when the influence of ripples in direct current exerting on the rotating electrical machine 80 or an inverter 10 is relatively small or when the back electromotive force of the rotating electrical machine 80 is relatively small and an increase in direct-current link voltage Vdc is unlikely to occur, even if drive of the rotating electrical machine 80 continues, there is no big problem. Thus, the rotating electrical machine control device 1 continues drive of the rotating electrical machine 80 in a limited operating region in which ripples in direct current are relatively small and the back electromotive force of the rotating electrical machine 80 is relatively small (#6).

Next, with reference to FIG. 12, processes performed upon a short-circuit failure will be described. As shown in FIG. 12, the rotating electrical machine control device 1 first detects a voltage (first direct-current link voltage Vdc1) at both ends of the first smoothing capacitor 41, a voltage (second direct-current link voltage Vdc2) at both ends of the second smoothing capacitor 42, a first battery current Ib1, and a second battery current Ib2 (#21). The first direct-current link voltage Vdc1 and the second direct-current link voltage Vdc2 (collectively referred to as direct-current link voltages Vdc) each are detected by being measured by a voltage sensor which is not shown in FIG. 1, etc., and obtained by the rotating electrical machine control device 1 through an in-vehicle network, e.g., the CAN. The first battery current Ib1 and the second battery current Ib2 each are also detected, as described above, by being measured by a current sensor which is not shown in FIG. 1, etc., and obtained by the rotating electrical machine control device 1 through an in-vehicle network, e.g., the CAN. The rotating electrical machine control device 1 detects the first direct-current link voltage Vdc1, the second direct-current link voltage Vdc2, the first battery current Ib1, and the second battery current Ib2 based on a control cycle of vector control.

Note that when a short-circuit failure has occurred in a smoothing capacitor 4, a direct-current link voltage Vdc on a side where the smoothing capacitor 4 is connected drops to substantially zero [V]. When viewed from a direct-current power supply 6, a load is substantially zero, and thus, theoretically, a substantially infinite large battery current Ib flows. Hence, for example, by operation of an overcurrent detection circuit which is not shown, etc., a contactor 9 connected to the direct-current power supply 6 is controlled to an open state. The overcurrent detection circuit may be, for example, a fuse, and for example, when the contactor 9 includes an electromagnetic relay, by interrupting the passage of current through a coil of the electromagnetic relay, the electromagnetic relay can be brought into an open state. When the contactor 9 goes into an open state, a circuit on an inverter 10 side including the smoothing capacitor 4 is disconnected from the direct-current power supply 6, and thus, the battery current Ib is substantially zero. The battery currents Ib and direct-current link voltages Vdc detected at the above-described step #21 are those detected after the contactor 9 goes into an open state.

Subsequent to step #21, the rotating electrical machine control device 1 determines whether the direct-current link voltages Vdc are less than or equal to a voltage for a short circuit Vshrt_ref and whether the battery currents Ib are less than or equal to a current for a short circuit Ishrt_ref (#22). Then, when the determination conditions are satisfied, the rotating electrical machine control device 1 determines that a smoothing capacitor 4 has a short-circuit failure, and sets one of the inverters 10 to which the smoothing capacitor 4 is connected as a failure-side inverter, and sets the other one of the inverters 10 as a normal-side inverter (#23). Namely, it is determined whether a direct-current link voltage Vdc has dropped to nearly zero [V] due to a short-circuited state occurring between the positive and negative polarities of direct current by a short-circuit of a smoothing capacitor 4, and whether a battery current Ib has reached zero [A] due to a contactor 9 being brought into an open state by an overcurrent of the battery current Ib. Thus, the voltage for a short circuit Vshrt_ref is set to substantially zero [V] and the current for a short circuit Ishrt_ref is set to substantially zero [A].

Specifically, the rotating electrical machine control device 1 determines whether the first direct-current link voltage Vdc1 is less than or equal to the voltage for a short circuit Vshrt_ref and whether the first battery current Ib1 is less than or equal to the current for a short circuit Ishrt_ref (#22a). Then, when the determination conditions are satisfied, the rotating electrical machine control device 1 determines that the first smoothing capacitor 41 has a short-circuit failure, and sets the first inverter 11 to which the first smoothing capacitor 41 is connected as a failure-side inverter, and sets the second inverter 12 which is the other one as a normal-side inverter (#23a). When the determination conditions at step #22a are not satisfied, the rotating electrical machine control device 1 determines whether the second direct-current link voltage Vdc2 is less than or equal to the voltage for a short circuit Vshrt_ref and whether the second battery current Ib2 is less than or equal to the current for a short circuit Ishrt_ref (#22b). Then, when the determination conditions are satisfied, the rotating electrical machine control device 1 determines that the second smoothing capacitor 42 has a short-circuit failure, and sets the second inverter 12 to which the second smoothing capacitor 42 is connected as a failure-side inverter, and sets the first inverter 11 which is the other one as a normal-side inverter (#23b). Note that needless to say, step #22a and step #22b may be performed in reversed order.

Note that though not shown in FIG. 12, as with steps #4 and #5 of FIG. 11, a mode may be adopted in which when it is determined at step #23 that a smoothing capacitor 4 has a short-circuit failure, a driver, etc., of the vehicle is informed about the short-circuit failure.

When the rotating electrical machine control device 1 determines that a short-circuit failure has occurred in one of the first smoothing capacitor 41 and the second smoothing capacitor 42, the rotating electrical machine control device 1 performs shutdown control on the first inverter 11 and the second inverter 12 (#24). Namely, shutdown control is performed on both inverters 10, including not only the failure-side inverter but also the normal-side inverter. Here, when the rotational speed (represented by "ω" here) of the rotating electrical machine 80 is greater than or equal to a first speed threshold value ωth1, a state in which shutdown control is performed on both inverters 10 is maintained, and the rotational speed of the rotating electrical machine 80 is reduced by so-called braking torque (#25 and #26). Then, when the rotational speed of the rotating electrical machine 80 reaches less than a second speed threshold value ωth2, the rotating electrical machine control device 1 drives the rotating electrical machine 80 by so-called single-inverter drive by performing active short-circuit control on the failure-side inverter and driving the normal-side inverter by pulse width modulation control (#27 and #28). Note that the first speed threshold value ωth1 and the second speed threshold value ωth2 may be identical values, and in this case, the first speed threshold value ωth1 and the second speed threshold value ωth2 are collectively referred to as speed threshold value ωth.

When the rotational speed of the rotating electrical machine 80 is relatively high, a back electromotive voltage associated with rotation of the rotating electrical machine 80 is higher than a direct-current link voltage Vdc of the normal-side inverter, and as a result, freewheeling diodes 35 connected in parallel to switching elements 3 in the failure-side inverter are turned on, by which currents flow through the stator coils 8 through the first inverter 11 and the second inverter 12. When the rotational speed decreases and the back electromotive voltage also decreases, active short control is performed on the failure-side inverter, by which currents can flow through the stator coils 8 through the first inverter 11 and the second inverter 12. The failure-side inverter is short-circuited, and as described above, the stator coils 8 result in the Y-connected stator coils 8 with the failure-side inverter serving as a neutral point, and by performing switching control on the normal-side inverter, drive of the rotating electrical machine 80 is controlled.

As such, when a voltage (first direct-current link voltage Vdc1) at both ends of the first smoothing capacitor 41 is less than or equal to a predefined voltage for a short circuit Vshrt_ref, and a current (first battery current Ib1) flowing through the first direct-current power supply 61 is less than or equal to a predefined current for a short circuit Ishrt_ref, the rotating electrical machine control device 1 determines that the first smoothing capacitor 41 has a short-circuit failure. In addition, the rotating electrical machine control device 1 is opened when a voltage (second direct-current link voltage Vdc2) at both ends of the second smoothing capacitor 42 is less than or equal to the voltage for a short circuit Vshrt_ref and a current (second battery current Ib2) flowing through the second direct-current power supply 62 is greater than or equal to the overcurrent threshold value (OC_ref). For example, the first contactor 91 is based on the first battery current Ib1, and when (the second battery current Ib2) is less than or equal to the current for a short circuit Ishrt_ref, the second contactor 92 determines that the second smoothing capacitor 42 has a short-circuit failure.

By a smoothing capacitor 4 causing a short-circuit failure, a voltage at both ends of the smoothing capacitor 4 becomes substantially zero and becomes less than or equal to the voltage for a short circuit. In addition, due to the short circuit, a large current flows, resulting in a contactor 9 going into an open state, and thus, a current flowing through a direct-current power supply 6 also becomes substantially zero. Thus, whether a short-circuit failure has occurred in a smoothing capacitor 4 can be appropriately determined by currents flowing through the direct-current power supplies 6 and voltages at both ends of the smoothing capacitors 4.

In addition, as described above with reference to FIG. 12, when the rotating electrical machine control device 1 determines that the first smoothing capacitor 41 or the second smoothing capacitor 42 has a short-circuit failure, in a state in which the rotational speed of the rotating electrical machine 80 is greater than or equal to a predefined speed threshold value (first speed threshold value ωth1), both the first inverter 11 and the second inverter 12 are controlled by shutdown control. In addition, in a state in which the rotational speed of the rotating electrical machine 80 is less than the speed threshold value (the first speed threshold value ωth1 or the second speed threshold value ωth2), the rotating electrical machine control device 1 controls, by pulse width modulation control, an inverter 10 to which a normal smoothing capacitor 4 is connected, and controls, by active short-circuit control, an inverter 10 to which a smoothing capacitor 4 having the short-circuit failure is connected, the inverters 10 being the first inverter 11 and the second inverter 12.

When the rotational speed of the rotating electrical machine 80 is relatively high, shutdown control is performed on both inverters 10, by which the rotational speed of the rotating electrical machine 80 can be reduced by so-called braking torque. When the rotational speed of the rotating electrical machine 80 is relatively low, active short-circuit control is performed on an inverter 10 to which a smoothing capacitor 4 having a short-circuit failure is connected, by which the inverter 10 is short-circuited, and the rotating electrical machine 80 having open-end windings can result in the rotating electrical machine 80 having Y-connected windings in which the open-end windings are short-circuited on the inverter 10 side. Then, the control part (rotating electrical machine control device 1) can appropriately control the rotating electrical machine 80 including the Y-connected type windings through one of the inverters 10 to which a normal smoothing capacitor 4 is connected.

Note that when the rotational speed of the rotating electrical machine 80 is high, too, instead of performing shutdown control on both inverters 10, the rotating electrical machine control device 1 may control, by active short-circuit control, an inverter 10 to which a smoothing capacitor 4 having a short-circuit failure is connected, and control, by shutdown control, an inverter 10 to which a normal smoothing capacitor 4 is connected.

In addition, in the present embodiment, a mode is exemplified and described in which the rotating electrical machine control device 1 detects both of a case in which a smoothing capacitor 4 has an open-circuit failure and a case in which a smoothing capacitor 4 has a short-circuit failure. However, a mode may be adopted in which the rotating electrical machine control device 1 detects only an open-circuit failure of a smoothing capacitor 4. Likewise, a mode may be adopted in which the rotating electrical machine control device 1 detects only a short-circuit failure of a smoothing capacitor 4.

Figure 13:
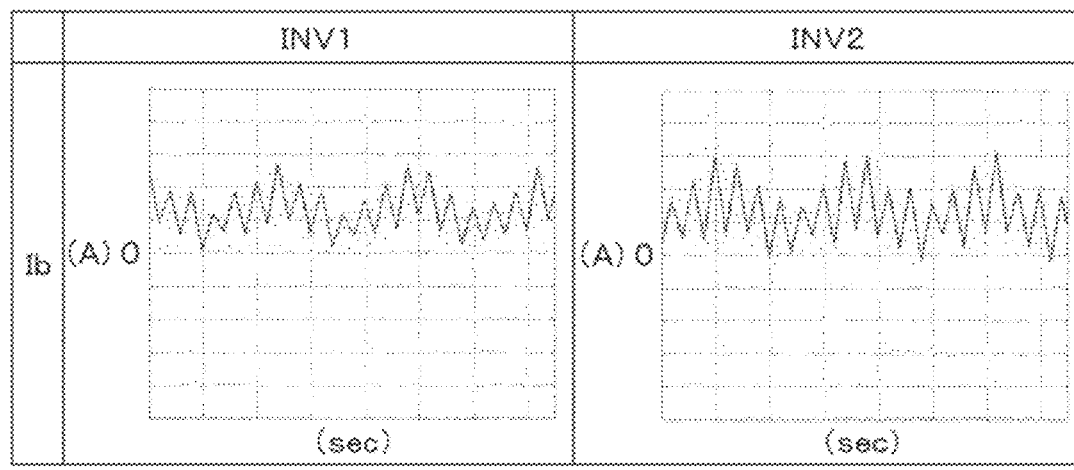
FIG. 13 is a waveform diagram showing an example of ripple waveforms of battery currents for a case in which an open-circuit failure has occurred upon control by mixed continuous pulse width modulation with a low-torque instruction.
Figure 14:
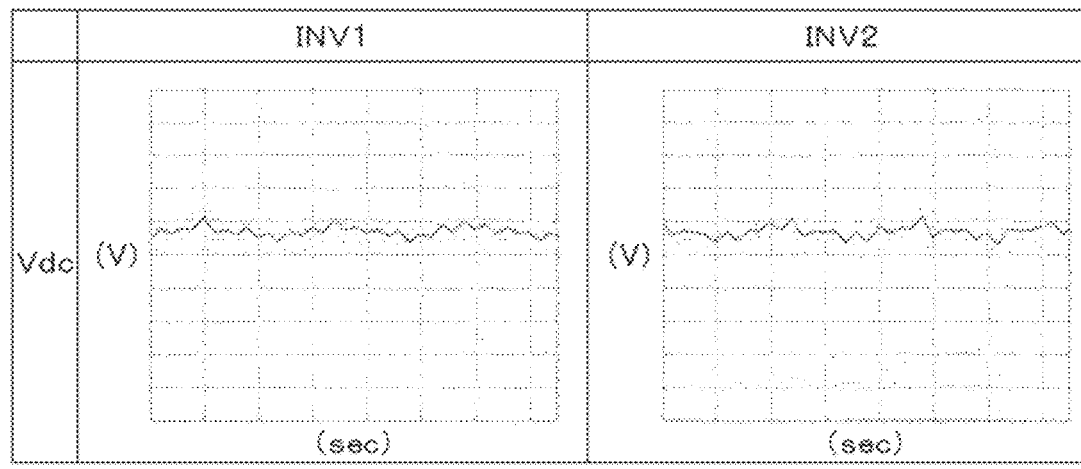
FIG. 14 is a waveform diagram showing an example of ripple waveforms of direct-current link voltages for a case in which an open-circuit failure has occurred upon control by mixed continuous pulse width modulation with a low-torque instruction.
Figure 15:
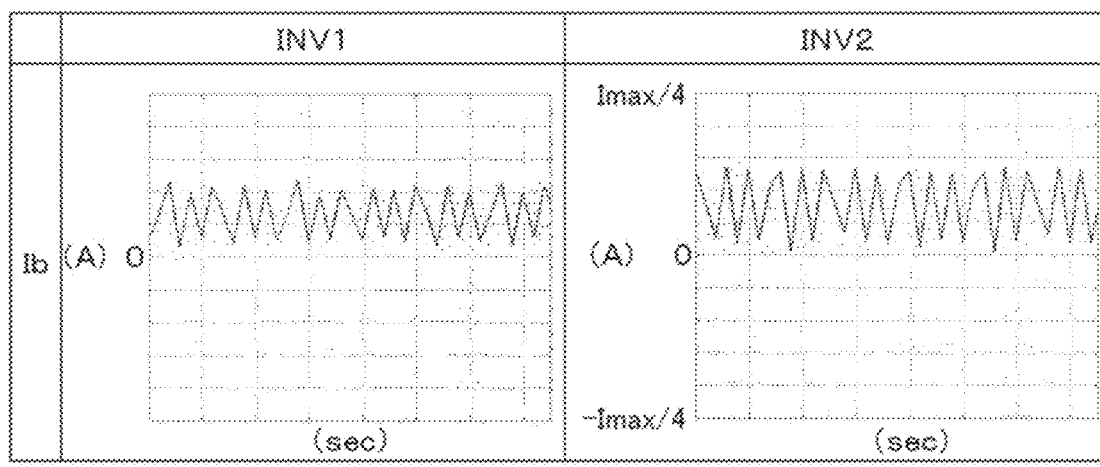
FIG. 15 is a waveform diagram showing an example of ripple waveforms of battery currents for a case in which an open-circuit failure has occurred upon control by discontinuous pulse width modulation with a low-torque instruction.
Figure 16:
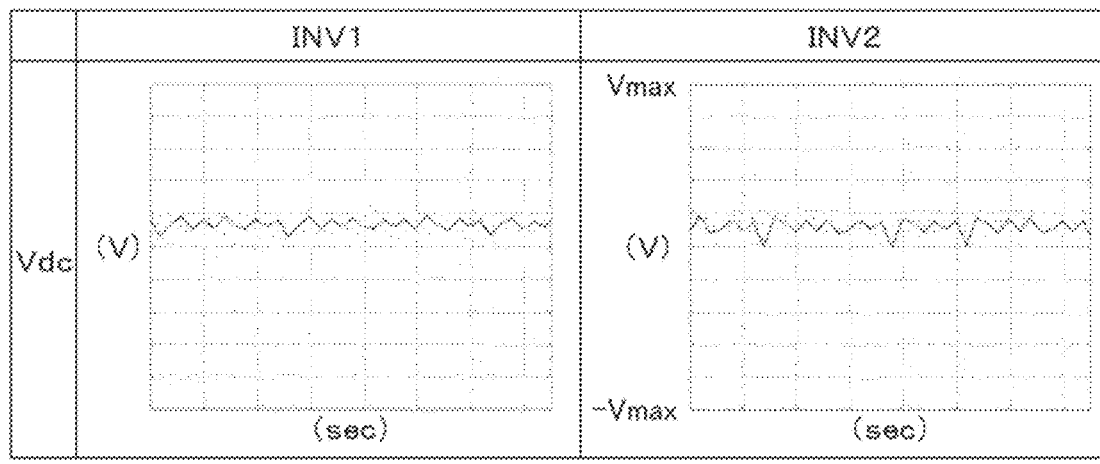
FIG. 16 is a waveform diagram showing an example of ripple waveforms of direct-current link voltages for a case in which an open-circuit failure has occurred upon control by discontinuous pulse width modulation with a low-torque instruction.
Figure 17:
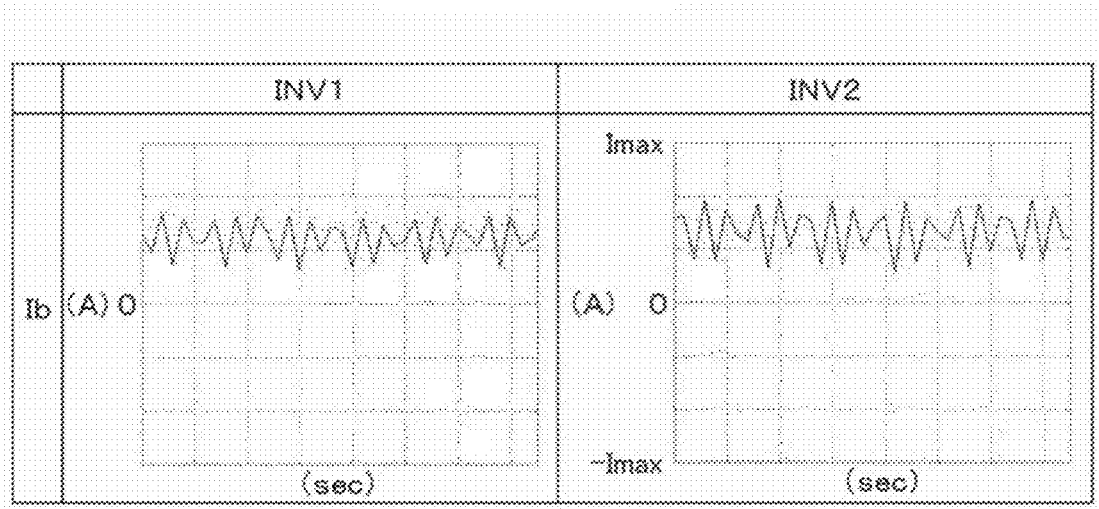
FIG. 17 is a waveform diagram showing an example of ripple waveforms of battery currents for a case in which an open-circuit failure has occurred upon control by discontinuous pulse width modulation with a high-torque instruction.
Figure 18:
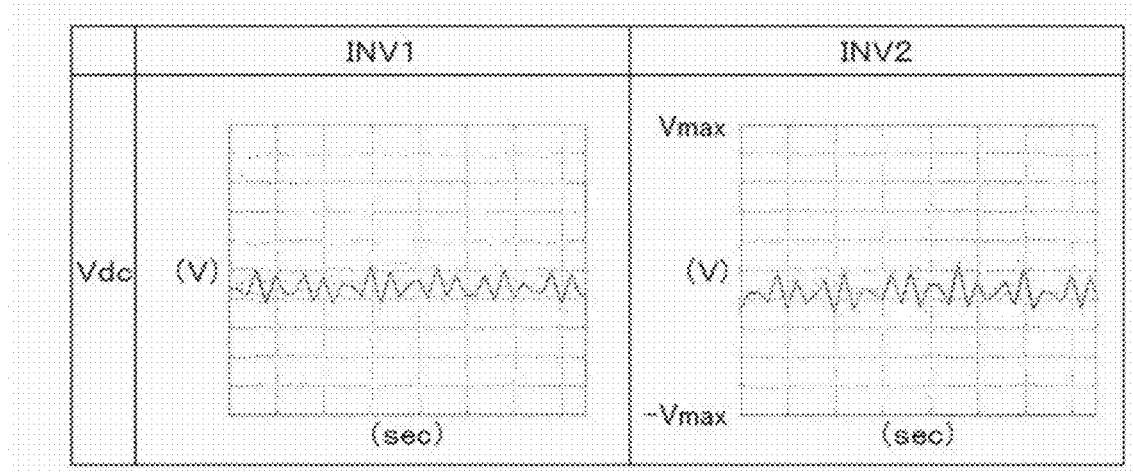
FIG. 18 is a waveform diagram showing an example of ripple waveforms of direct-current link voltages for a case in which an open-circuit failure has occurred upon control by discontinuous pulse width modulation with a high-torque instruction.

Simulation results for a case in which an open-circuit failure has occurred in a smoothing capacitor 4 and for a case in which a short-circuit failure has occurred in a smoothing capacitor 4 will be described below with reference to FIGS. 13 to 18 and FIGS. 19 to 21, respectively. First, a case in which an open-circuit failure has occurred in a smoothing capacitor 4 will be described. FIGS. 13 and 14 exemplify a case in which an open-circuit failure has occurred upon control by mixed continuous pulse width modulation with a low-torque instruction (e.g., about 30 [Nm]), FIGS. 15 and 16 exemplify a case in which an open-circuit failure has occurred upon control by discontinuous pulse width modulation with a low-torque instruction (e.g., about 30 [Nm]), and FIGS. 17 and 18 exemplify a case in which an open-circuit failure has occurred upon control by discontinuous pulse width modulation with a high-torque instruction (e.g., about 140 [Nm]). In addition, waveform diagrams of FIGS. 13, 15, and 17 each show an example of ripple waveforms of battery currents Ib, and waveform diagrams of FIGS. 14, 16, and 18 each show an example of ripple waveforms of direct-current link voltages Vdc. All of FIGS. 13 to 18 exemplify a case in which an open-circuit failure has occurred in the second smoothing capacitor 42. Table 3 shown below shows an example of the wave height values of the battery currents Ib. In addition, table 4 shown below shows an example of the wave height values of the direct-current link voltages Vdc.

TABLE 3

| A | Low torque | | | | High torque | |
|---|---|---|---|---|---|---|
| Control scheme | MX-CPWM | | DPWM | | DPWM | |
| Inverter | INV1 | INV2 | INV1 | INV2 | INV1 | INV2 |
| Ib wave height value | 52.3 | 66.2 | 40.3 | 52.5 | 105.7 | 133.6 |
| Difference | 13.9 | | 12.2 | | 27.9 | |

TABLE 4

| V | Low torque | | | | High torque | |
|---|---|---|---|---|---|---|
| Control scheme | MX-CPWM | | DPWM | | DPWM | |
| Inverter | INV1 | INV2 | INV1 | INV2 | INV1 | INV2 |
| Vdc wave height value | 3.1 | 4.2 | 3.2 | 4.6 | 6.3 | 7.4 |
| Difference | 1.1 | | 1.4 | | 1.1 | |

As is clear from table 4, regardless of a torque instruction for the rotating electrical machine 80, a large difference is not observed in the wave height values of the direct-current link voltages Vdc. Thus, even when a smoothing capacitor 4 has an open-circuit failure, it is difficult to make a determination about the open-circuit failure, using the direct-current link voltages Vdc. On the other hand, as shown in table 3, for the battery currents Ib, the wave height value is large when the torque instruction for the rotating electrical machine 80 is high torque compared to when the torque instruction is low torque. In addition, even with relatively low torque, compared to the direct-current link voltages Vdc, a difference in wave height value is large between a first inverter 11 side and a second inverter 12 side. Thus, as described above, the rotating electrical machine control device 1 can perform fail-safe control by appropriately determining a short-circuit failure of a smoothing capacitor 4 based on the battery currents Ib.

Meanwhile, the accuracy of a current sensor that measures the battery currents Ib generally has limitations due to a trade-off between the accuracy and cost, etc. Due to individual differences between current sensors, errors associated with an operating environment, etc., an error of about 10 [A] may occur in the measurement value of a current sensor. Thus, in a case of low torque such as that shown in table 3, it may be difficult to distinguish whether a difference between wave height values results from an open-circuit failure of a smoothing capacitor 4 or results from an error of the current sensor. Thus, it is preferred that when the torque of the rotating electrical machine 80 is relatively high, whether a smoothing capacitor 4 has an open-circuit failure be determined.

When the torque of the rotating electrical machine 80 is low, currents flowing through the stator coils 8 are small compared to a case of large torque, and thus, the smoothing effect of the smoothing capacitors 4 sufficiently functions. Hence, as shown in tables 3 and 4, even if an open-circuit failure has occurred in one of the smoothing capacitors 4, a very large battery current Ib does not flow through one of the direct-current power supplies 6 and thus the direct-current power supplies 6 are unlikely to be exhausted. In addition, since large changes do not occur in the battery currents Ib and the direct-current link voltages Vdc, there is almost no increase in the influence on the switching elements 3 in the inverters 10. Likewise, there is almost no increase in the influence on the stator coils 8 of the rotating electrical machine 80, either. Thus, there is almost no influence on travel of a vehicle that uses the rotating electrical machine 80 as a drive power source for wheels. Thus, the rotating electrical machine control device 1 does not need to particularly limit drive of the rotating electrical machine 80. Hence, it is preferred that the difference threshold value Idiff_ref be set based on a difference between wave height values for a case of relatively high torque of the rotating electrical machine 80.

For example, the difference threshold value Idiff_ref is set to a value based on a difference between the wave height value (Ibpp) of a battery current Ib flowing through a direct-current power supply 6 connected to a smoothing capacitor 4 having caused an open-circuit failure and the wave height value (Ibpp) of a battery current Ib flowing through a direct-current power supply 6 connected to a normal smoothing capacitor 4 during output of defined torque which is more than half of maximum torque that can be outputted from the rotating electrical machine 80, the smoothing capacitor 4 and the normal smoothing capacitor 4 each being one of the first smoothing capacitor 41 and the second smoothing capacitor 42. Note that it is preferred that the difference for the defined torque be twice or more of an error of a current sensor that detects the battery currents Ib.

When the difference is small, even if an open-circuit failure has occurred in one of the smoothing capacitors 4, there is almost no influence on the direct-current power supplies 6, the inverters 10, the rotating electrical machine 80, and the vehicle. Thus, there is no problem even if occurrence of an open-circuit failure in a smoothing capacitor 4 is not detected. On the other hand, when the difference is large, there is a possibility that any of the direct-current power supplies 6, the inverters 10, and the rotating electrical machine 80 may be influenced. Thus, it is desirable to promptly detect occurrence of an abnormality in a smoothing capacitor 4. According to experiments and simulations performed by the inventor, it has been found that when the torque of the rotating electrical machine 80 increases, the difference also increases. When, as described above, the determination threshold value (difference threshold value Idiff_ref) is set based on the difference obtained during output of defined torque from the rotating electrical machine 80, an open-circuit failure of a smoothing capacitor 4 can be appropriately detected.

In the present embodiment, the rotating electrical machine 80 is a drive power source that is mounted on a vehicle to drive wheels of the vehicle. As described above with reference to FIG. 11, when the rotating electrical machine control device 1 determines that the first smoothing capacitor 41 or the second smoothing capacitor 42 has an open-circuit failure, the rotating electrical machine control device 1 limits torque and rotational speed that can be outputted from the rotating electrical machine 80 within a defined range, and alerts a driver of the vehicle.

As described above, according to experiments and simulations performed by the inventor, it has been found that when the torque of the rotating electrical machine 80 increases, a difference also increases between the wave height value (Ibpp) of a current (battery current Ib) flowing through a direct-current power supply 6 connected to a smoothing capacitor 4 having caused an open-circuit failure and the wave height value (Ibpp) of a current (battery current Ib) flowing through a direct-current power supply 6 connected to a normal smoothing capacitor 4. That is, when the torque of the rotating electrical machine 80 decreases, the difference decreases to the extent that an open-circuit failure of a smoothing capacitor 4 cannot be detected. When the difference is small, even if an open-circuit failure has occurred in one of the smoothing capacitors 4, there is almost no influence on the direct-current power supplies 6, the inverters 10, and the rotating electrical machine 80. By the rotating electrical machine control device 1 (control part) limiting torque and rotational speed that can be outputted from the rotating electrical machine 80 within a defined range, the difference can be suppressed to be small. Note that it is preferred that the defined range be set to a range in which even if an open-circuit failure has occurred in one of the smoothing capacitors 4, the difference does not exceed the determination threshold value (difference threshold value Idiff_ref). Note, however, that limiting the torque and rotational speed of the rotating electrical machine 80 also limits travel of the vehicle. By alerting the driver of the vehicle, the driver can be prompted to bring the vehicle into a repair shop, etc., to repair the open-circuit failure of the smoothing capacitor 4.

Note that the rotating electrical machine control device 1 may only limit the torque and rotational speed of the rotating electrical machine 80 and may not provide an alert, or reversely, the rotating electrical machine control device 1 may only provide an alert and may not limit the torque and rotational speed of the rotating electrical machine 80. Note also that the rotating electrical machine control device 1 may be configured to neither limit the torque and rotational speed of the rotating electrical machine 80 nor provide an alert. For example, when the torque of the rotating electrical machine 80 is high, if an open-circuit failure has occurred in a smoothing capacitor 4, then, as described above, a difference between battery currents Ib increases. However, it does not immediately cause the direct-current power supplies 6, the inverters 10, and the rotating electrical machine 80 to fail in a chain reaction manner. Thus, action taken after detection of occurrence of an open-circuit failure in a smoothing capacitor 4 may be, for example, storing of the failure of the smoothing capacitor 4 in a vehicle's diagnostic recording memory, etc.

In addition, in the above description, a mode is exemplified and described in which in a case of low torque, in order to suppress erroneous detection of an open-circuit failure, the difference threshold value Idiff_ref is set based on a difference between battery currents Ib obtained during output of defined torque. As described above, this mode takes into account the accuracy of a current sensor that measures the battery currents Ib. However, when sufficient accuracy of the current sensor can be secured, irrespective of the defined torque, the difference threshold value Idiff_ref may be set based on the difference for lower torque. In addition, it does not hinder setting of the difference threshold value Idiff_ref irrespective of the torque of the rotating electrical machine 80.

Figure 19:
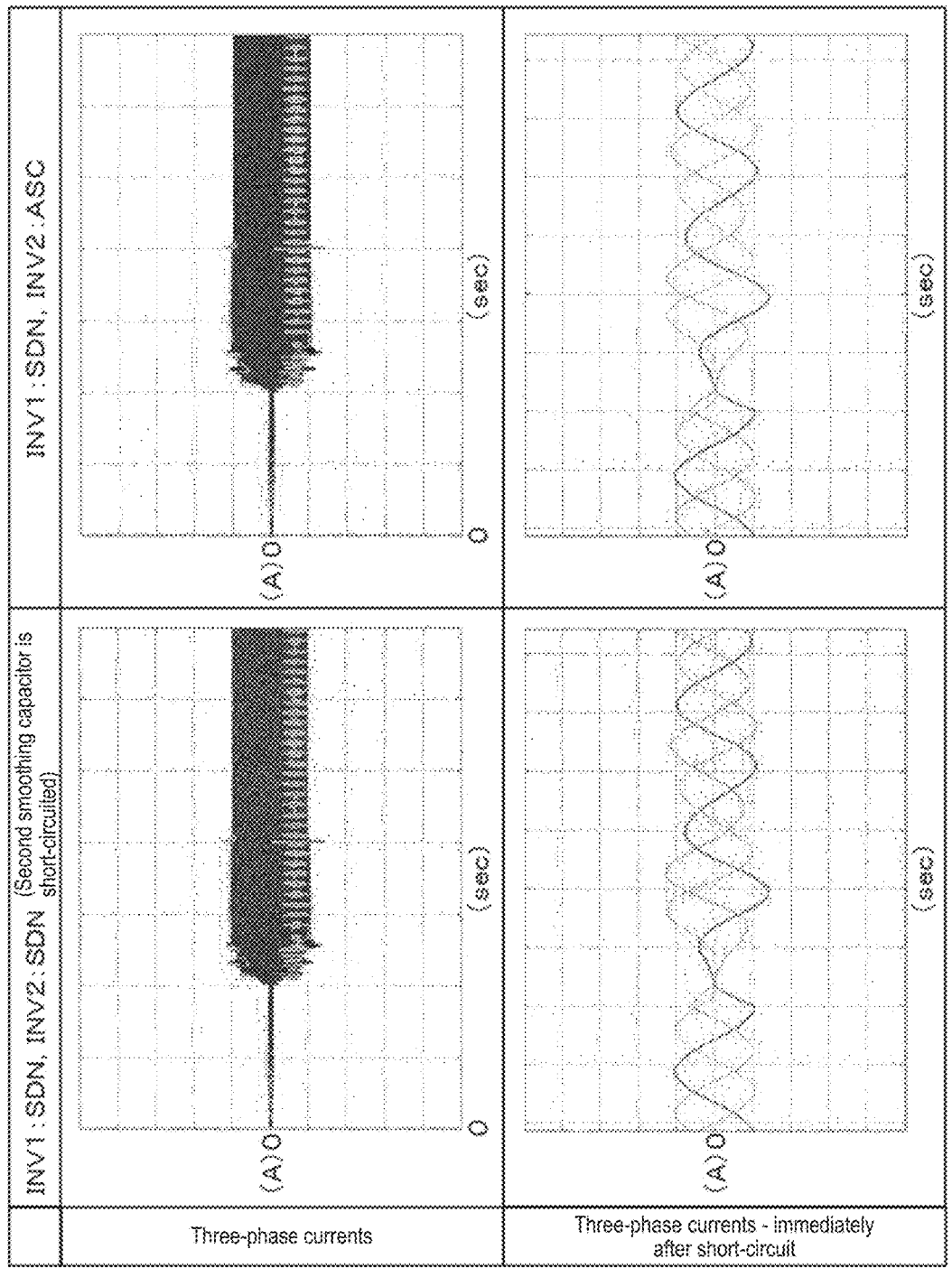
FIG. 19 is a waveform diagram showing an example of waveforms of three-phase currents for a case of performing shutdown and a case of performing active short-circuit control, as fail-safe control performed when a short-circuit failure has occurred.
Figure 20:
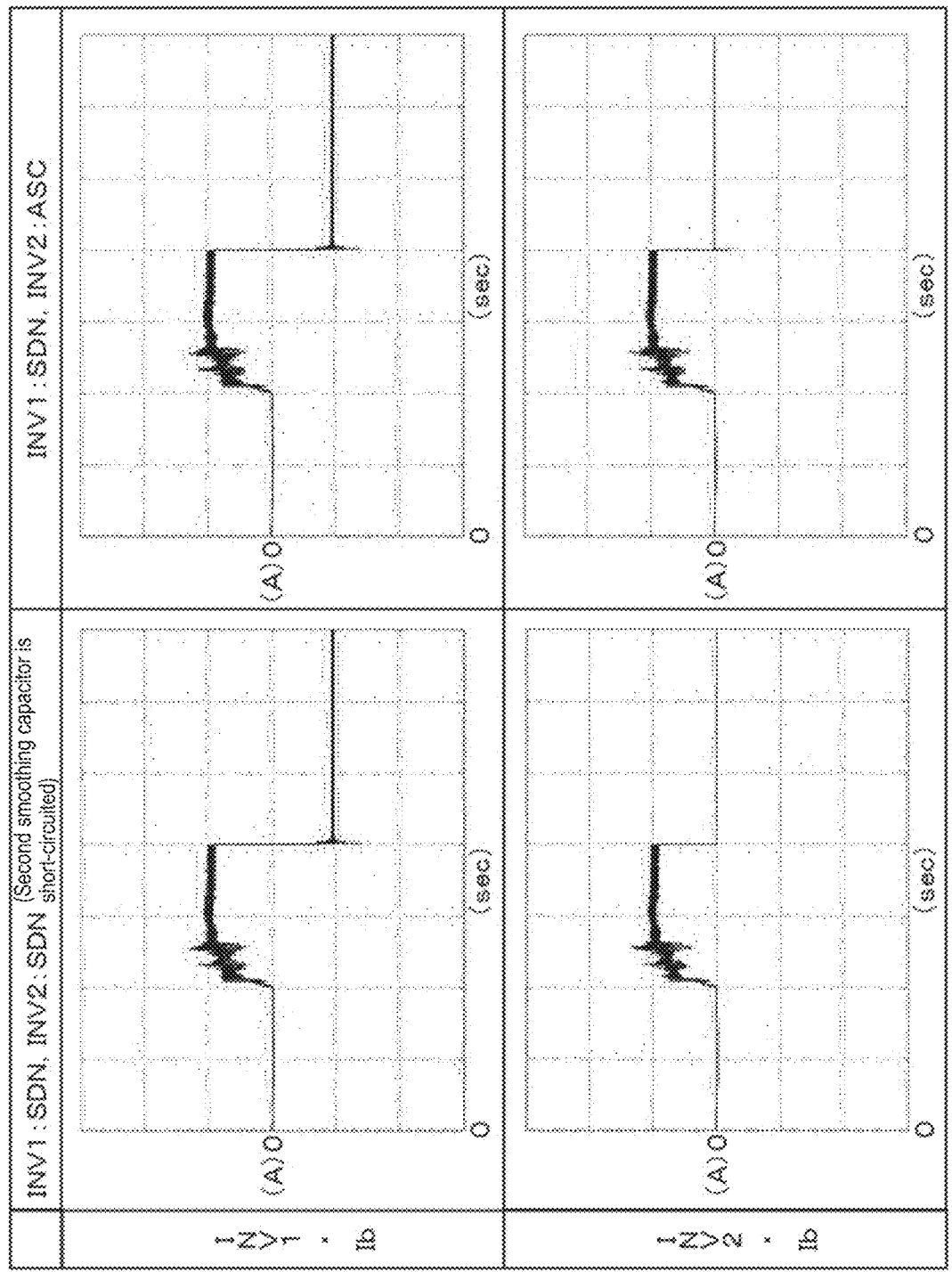
FIG. 20 is a waveform diagram showing an example of battery currents for a case of performing shutdown and a case of performing active short-circuit control, as fail-safe control performed when a short-circuit failure has occurred.
Figure 21:
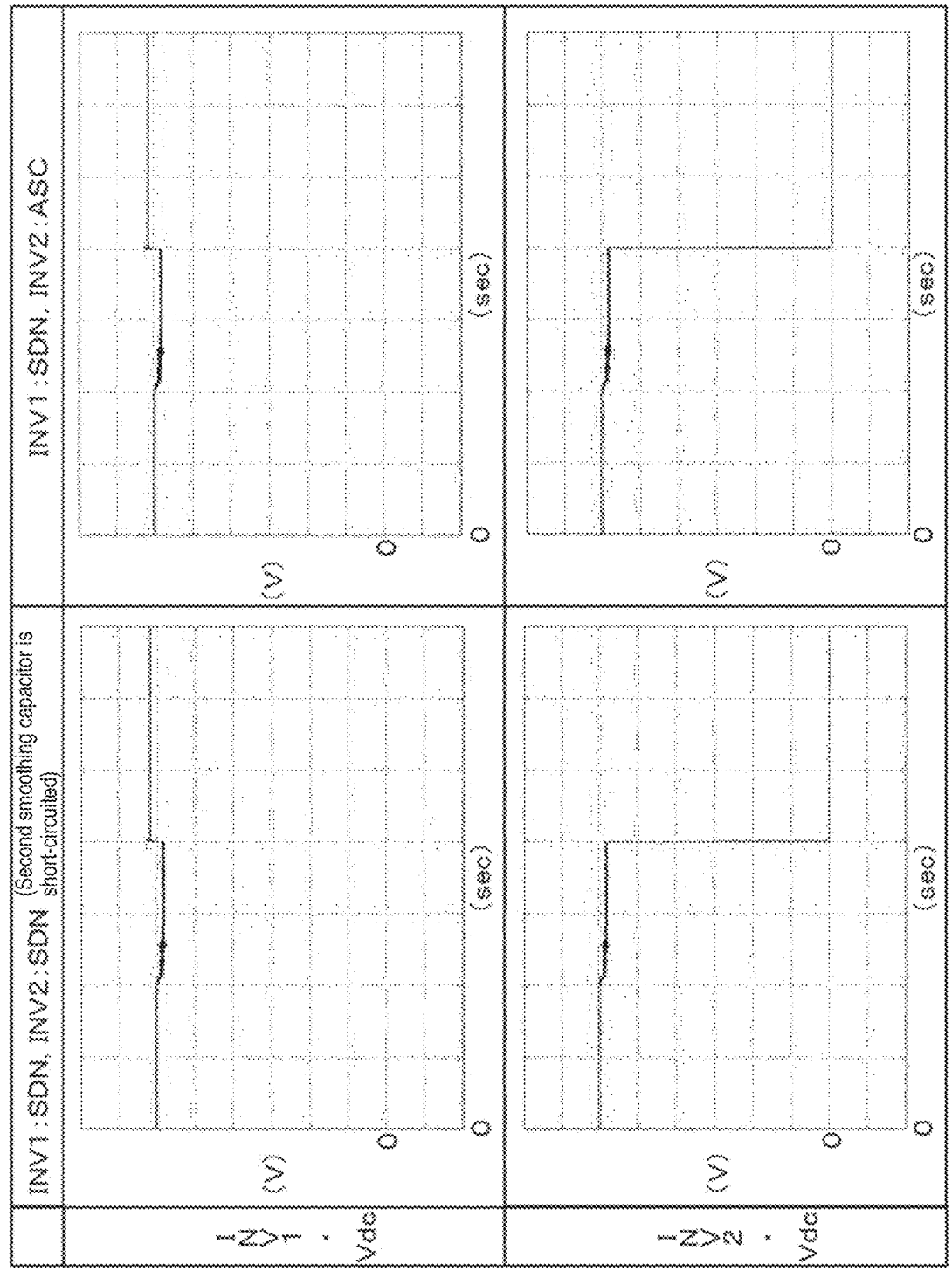
FIG. 21 is a waveform diagram showing an example of direct-current link voltages for a case of performing shutdown and a case of performing active short-circuit control, as fail-safe control performed when a short-circuit failure has occurred.

Next, with reference to FIGS. 19 to 21, simulation results for a case in which a short-circuit failure has occurred in a smoothing capacitor 4 will be described. A waveform diagram of FIG. 19 shows an example of waveforms of three-phase currents for a case of performing shutdown and a case of performing active short-circuit control, as fail-safe control performed when a short-circuit failure has occurred in the second smoothing capacitor 42. A waveform diagram of FIG. 20 shows an example of battery currents Ib for a case of performing shutdown and a case of performing active short-circuit control, as fail-safe control performed when a short-circuit failure has occurred in the second smoothing capacitor 42. A waveform diagram of FIG. 21 shows an example of direct-current link voltages Vdc for a case of performing shutdown and a case of performing active short-circuit control, as fail-safe control performed when a short-circuit failure has occurred in the second smoothing capacitor 42. FIGS. 19 to 21 show waveforms for a case in which the rotational speed of the rotating electrical machine 80 is in a so-called high rotation region. Note that the high rotation region referred to here is an operating region in which the rotating electrical machine 80 rotates at or higher than a rotational speed at which freewheeling diodes 35 are turned on by back electromotive force generated by the rotating electrical machine 80.

As shown in FIG. 19, in the high rotation region, the waveforms of three-phase currents are the same between when shutdown control is performed on the second inverter 12 which is a failure-side inverter and when active short-circuit control is performed on the second inverter 12. As shown in FIG. 20, the second inverter 12 is short-circuited by turning on freewheeling diodes 35, by which the second inverter 12 serves as a neutral point of the stator coils 8. Thus, the second battery current Ib2 on a second inverter 12 side is zero. The first battery current Ib1 on a first inverter 11 side has a regenerative current flowing thereinto. In addition, as shown in FIG. 21, the second direct-current link voltage Vdc2 on the second inverter 12 side is substantially zero due to the short-circuit of the second smoothing capacitor 42. The first direct-current link voltage Vdc1 on the first inverter 11 side slightly increases due to the short-circuit of the second smoothing capacitor 42.

In a case in which a short-circuit failure has occurred in the second smoothing capacitor 42 and shutdown control is performed as fail-safe control, when the rotational speed of the rotating electrical machine 80 is low, regardless of the torque of the rotating electrical machine 80, a current does not flow through the first direct-current power supply 61 and thus the rating of the first direct-current power supply 61 is not exceeded. Likewise, currents do not flow through the inverters 10, either, and thus a breakdown of the switching elements 3 is not caused. Since currents do not flow through the stator coils 8, either, a breakdown of the rotating electrical machine 80 is not caused, either. The vehicle gradually decelerates by inertia torque. Thus, for example, even when a short-circuit failure has occurred in a smoothing capacitor 4 during travel of the vehicle, the vehicle is allowed to travel to a safe location such as a road shoulder and can be stopped. So-called limp home is possible.

When the rotational speed of the rotating electrical machine 80 is high, only the first direct-current power supply 61 connected to the first inverter 11 which is a normal-side inverter is connected to the rotating electrical machine 80. Hence, as shown in FIG. 20, large battery currents Ib flow, but are within a range of use of the direct-current power supplies 6 and thus there is no problem. Likewise, comparable currents also flow through the inverters 10 and the stator coils 8, but are also within a range of use and thus there is no problem. In addition, as described above with reference to FIG. 12, when the rotational speed of the rotating electrical machine 80 is high, the vehicle decelerates by braking torque generated by performing shutdown control on both inverters 10. Then, after the speed of the vehicle is sufficiently reduced, drive of the rotating electrical machine 80 is controlled by single-inverter drive performed by the normal-side inverter. Thus, as in a case of a low rotational speed, for example, even when a short-circuit failure has occurred in a smoothing capacitor 4 during travel of the vehicle, the vehicle is allowed to travel to a safe location such as a road shoulder and can be stopped. So-called limp home is possible.

As described above, according to the present embodiment, when a failure has occurred in one of the smoothing capacitors provided for the respective two inverters each provided at each end side of the open-end windings, the failed smoothing capacitor can be identified.

Summary of the Embodiment

A summary of the rotating electrical machine control system (100) described above will be briefly described below.

In one aspect, a rotating electrical machine control system (100) that controls drive of a rotating electrical machine (80) having open-end windings (8) of a plurality of phases that are independent of each other includes a first inverter (11) connected to a one-end side of the open-end windings (8); a second inverter (12) connected to an other-end side of the open-end windings (8); a first direct-current power supply (61) to which the first inverter (11) is connected; a second direct-current power supply (62) to which the second inverter (12) is connected; a first smoothing capacitor (41) connected in parallel to the first direct-current power supply (61); a second smoothing capacitor (42) connected in parallel to the second direct-current power supply (62); and a control part (1) that can control the first inverter (11) and the second inverter (12) independently of each other, and when a difference between a first wave height value (Ibpp1) which is a wave height value (Ibpp) of a current flowing through the first direct-current power supply (61) and a second wave height value (Ibpp2) which is a wave height value (Ibpp) of a current flowing through the second direct-current power supply (62) is greater than or equal to a determination threshold value (diff_reff) defined in advance and the first wave height value (Ibpp1) is larger than the second wave height value (Ibpp2), the control part (1) determines that the first smoothing capacitor (41) has an open-circuit failure, and when a difference between the first wave height value (Ibpp1) and the second wave height value (Ibpp2) is greater than or equal to the determination threshold value (diff_ref) and the second wave height value (Ibpp2) is larger than the first wave height value (Ibpp1), the control part (1) determines that the second smoothing capacitor (42) has an open-circuit failure.

If the capacitance of a smoothing capacitor (4) decreases, then when, for example, ripples have occurred in a current flowing through a direct-current power supply (6), the ability to smooth the ripples decreases, increasing the wave height value (Ibpp) of the ripples. When the capacitance is reduced due to occurrence of an open-circuit failure in one of the first smoothing capacitor (41) and the second smoothing capacitor (42), a difference in ripple smoothing ability between the first smoothing capacitor (41) and the second smoothing capacitor (42) increases, increasing a difference between the wave height values (Ibpp) of ripples. The difference tends to increase as a difference between electrostatic capacities increases, and thus, when the difference is greater than or equal to the determination threshold value (diff_ref), the control part (1) can determine that an open-circuit failure has occurred in either one of the smoothing capacitors (4). Note that according to experiments and simulations performed by the inventor, it has been found that a smoothing capacitor (4) having caused an open-circuit failure and a normal smoothing capacitor (4) have the same trend regarding an increase and a decrease in the magnitude of the wave height value (Ibpp), and thus, it is difficult to distinguish therebetween and the magnitude of the wave height value (Ibpp) is not appropriate to use to determine a failure. Note, however, that in a smoothing capacitor (4) with a reduced electrostatic capacity, the wave height value (Ibpp) increases greatly, and thus, when one of the smoothing capacitors (4) has an open-circuit failure, a difference between wave height values (Ibpp) increases. Thus, the control part (1) can appropriately determine, by the difference, whether a smoothing capacitor (4) has an open-circuit failure. In addition, since the ripple smoothing ability decreases as the electrostatic capacity decreases, the wave height value (Ibpp) of ripples increases. Thus, the control part (1) can determine that an open-circuit failure has occurred in one of the smoothing capacitors (4) with a larger wave height value (Ibpp). As such, according to this configuration, when a failure has occurred in one of the smoothing capacitors (4) provided for the respective two inverters (10) each provided at each end side of the open-end windings (8), the failed smoothing capacitor (4) can be identified.

Here, it is preferred that the determination threshold value (diff_ref) be set to a value based on a difference between a wave height value (Ibpp) of a current flowing through one of direct-current power supplies (6) connected to a smoothing capacitor (4) having caused an open-circuit failure and a wave height value (Ibpp) of a current flowing through one of the direct-current power supplies (6) connected to a normal smoothing capacitor (4) during output of defined torque which is more than half of maximum torque that can be outputted from the rotating electrical machine (80), the smoothing capacitor (4) and the normal smoothing capacitor (4) each being one of the first smoothing capacitor (41) and the second smoothing capacitor (42).

When the difference is small, even if an open-circuit failure has occurred in one of the smoothing capacitors (4), there is almost no influence on the direct-current power supplies (6), the inverters (10), the rotating electrical machine (80), and a vehicle. Thus, there is no problem even if occurrence of an open-circuit failure in a smoothing capacitor (4) is not detected. On the other hand, when the difference is large, there is a possibility that any of the direct-current power supplies (6), the inverters (10), and the rotating electrical machine (80) may be influenced. Thus, it is desirable to promptly detect occurrence of an abnormality in a smoothing capacitor (4). According to experiments and simulations performed by the inventor, it has been found that when the torque of the rotating electrical machine (80) increases, the difference also increases. When, as described above, the determination threshold value (diff_ref) is set based on the difference obtained during output of defined torque from the rotating electrical machine (80), an open-circuit failure of a smoothing capacitor (4) can be appropriately detected.

In addition, it is preferred that the rotating electrical machine (80) be a drive power source that is mounted on a vehicle to drive wheels of the vehicle, and when the control part (1) determines that the first smoothing capacitor (41) or the second smoothing capacitor (42) has an open-circuit failure, the control part (1) limit torque and rotational speed that can be outputted from the rotating electrical machine (80) within a defined range, and alert a driver of the vehicle.

According to experiments and simulations performed by the inventor, it has been found that when the torque of the rotating electrical machine (80) increases, a difference also increases between the wave height value (Ibpp) of a current (battery current (Ib)) flowing through a direct-current power supply (6) connected to a smoothing capacitor (4) having caused an open-circuit failure and the wave height value (Ibpp) of a current (battery current (Ib)) flowing through a direct-current power supply (6) connected to a normal smoothing capacitor (4). That is, when the torque of the rotating electrical machine (80) decreases, the difference decreases to the extent that an open-circuit failure of a smoothing capacitor (4) cannot be detected. When the difference is small, even if an open-circuit failure has occurred in one of the smoothing capacitors (4), there is almost no influence on the direct-current power supplies (6), the inverters (10), and the rotating electrical machine (80). By the control part (1) limiting torque and rotational speed that can be outputted from the rotating electrical machine (80) within a defined range, the difference can be suppressed to be small. Note that it is preferred that the defined range be set to a range in which even if an open-circuit failure has occurred in one of the smoothing capacitors (4), the difference does not exceed the determination threshold value (diff_ref). Note, however, that limiting the torque and rotational speed of the rotating electrical machine (80) also limits travel of the vehicle. By alerting the driver of the vehicle, the driver can be prompted to bring the vehicle into a repair shop, etc., to repair the open-circuit failure of the smoothing capacitor (4).

In addition, it is preferred that the rotating electrical machine control system (100) include a first contactor (91) that establishes and cuts off an electrical connection between the first direct-current power supply (61), and the first smoothing capacitor (41) and the first inverter (11); and a second contactor (92) that establishes and cuts off an electrical connection between the second direct-current power supply (62), and the second smoothing capacitor (42) and the second inverter (12), the first contactor (91) be opened when a current (Ib1) flowing through the first direct-current power supply (61) is greater than or equal to an overcurrent threshold value defined in advance, the second contactor (92) be opened when a current (Ib2) flowing through the second direct-current power supply (62) is greater than or equal to the overcurrent threshold value, and when a voltage (Vdc1) at both ends of the first smoothing capacitor (41) is less than or equal to a voltage for a short circuit (Vshrt_ref) defined in advance and a current (Ib1) flowing through the first direct-current power supply (61) is less than or equal to a current for a short circuit (Ishrt_ref) defined in advance, the control part (1) determine that the first smoothing capacitor (41) has a short-circuit failure, and when a voltage (Vdc2) at both ends of the second smoothing capacitor (42) is less than or equal to the voltage for a short circuit (Vshrt_ref) and a current (Ib2) flowing through the second direct-current power supply (62) is less than or equal to the current for a short circuit (Ishrt_ref), the control part (1) determine that the second smoothing capacitor (42) has a short-circuit failure.

By a smoothing capacitor (4) causing a short-circuit failure, a voltage (Vdc) at both ends of the smoothing capacitor (4) becomes substantially zero and becomes less than or equal to the voltage for a short circuit (Vshrt_ref). In addition, due to the short circuit, a large current flows, resulting in a contactor (9) going into an open state, and thus, a current flowing through a direct-current power supply (6) also becomes substantially zero. Thus, whether a short-circuit failure has occurred in a smoothing capacitor (4) can be appropriately determined by currents (Ib) flowing through the direct-current power supplies (6) and voltages (Vdc) at both ends of the smoothing capacitors (4).

In addition, it is preferred that in the first inverter (11) and the second inverter (12), an arm (3A) for one alternating-current phase include a series circuit of an upper-stage-side switching element (3H) and a lower-stage-side switching element (3L), the control part (1) be able to control each of the first inverter (11) and the second inverter (12) by active short-circuit control that brings all of the upper-stage-side switching elements (3H) into off state and brings all of the lower-stage-side switching elements (3L) into on state, or brings all of the upper-stage-side switching elements (3H) into on state and brings all of the lower-stage-side switching elements (3L) into off state, and by shutdown control that brings all of the switching elements (3) of all of a plurality of phases into off state, and when the control part (1) determines that the first smoothing capacitor (41) or the second smoothing capacitor (42) has a short-circuit failure, in a state in which a rotational speed of the rotating electrical machine (80) is greater than or equal to a speed threshold value ($\omega$th) defined in advance, the control part (1) control both the first inverter (11) and the second inverter (12) by shutdown control, and in a state in which a rotational speed of the rotating electrical machine (80) is less than the speed threshold value ($\omega$th), the control part (1) control, by pulse width modulation control, one of inverters (10) to which a normal smoothing capacitor (4) is connected, and control, by active short-circuit control, one of the inverters (10) to which a smoothing capacitor (4) having the short-circuit failure is connected, the inverters (10) being the first inverter (11) and the second inverter (12).

When the rotational speed of the rotating electrical machine (80) is relatively high, shutdown control is performed on both inverters (10), by which the rotational speed of the rotating electrical machine (80) can be reduced by so-called braking torque. When the rotational speed of the rotating electrical machine (80) is relatively low, active short-circuit control is performed on an inverter (10) to which a smoothing capacitor (4) having a short-circuit failure is connected, by which the inverter (10) is short-circuited, and the rotating electrical machine (80) having the open-end windings (8) can result in the rotating electrical machine (80) in which the open-end windings (8) are short-circuited on the inverter (10) side (i.e., the rotating electrical machine (80) having Y-connected windings). Then, the control part (1) can appropriately control the rotating electrical machine (80) including the Y-connected type windings through one of the inverters (10) to which a normal smoothing capacitor (4) is connected.

REFERENCE SIGNS LIST

1: Rotating electrical machine control device (control part), 3: Switching element, 3A: Arm, 3H: Upper-stage-side switching element, 3L: Lower-stage-side switching element, 4: Smoothing capacitor, 6: Direct-current power supply, 8: Stator coil (open-end winding), 9: Contactor, 10: Inverter, 11: First inverter, 12: Second inverter, 41: First smoothing capacitor, 42: Second smoothing capacitor, 61: First direct-current power supply, 62: Second direct-current power supply, 80: Rotating electrical machine, 91: First contactor, 92: Second contactor, 100: Rotating electrical machine control system, Ib: Battery current, Ib1: First battery current (current flowing through the first direct-current power supply), Ib2: Second battery current (current flowing through the second direct-current power supply), Ibpp1: First wave height value, Ibpp2: Second wave height value, Ishrt_ref: Current for a short circuit, Vdc1: First direct-current link voltage (voltage at both ends of the first smoothing capacitor), Vdc2: Second direct-current link voltage (voltage at both ends of the second smoothing capacitor), Vshrt_ref: Voltage for a short circuit, diff_ref: Difference threshold value (determination threshold value), and $\omega$th: Speed threshold value

The invention claimed is:

1. A rotating electrical machine control system that controls drive of a rotating electrical machine having open-end windings of a plurality of phases that are independent of each other, the rotating electrical machine control system comprising:
   a first inverter connected to a one-end side of the open-end windings;
   a second inverter connected to an other-end side of the open-end windings;
   a first direct-current power supply to which the first inverter is connected;
   a second direct-current power supply to which the second inverter is connected;
   a first smoothing capacitor connected in parallel to the first direct-current power supply;
   a second smoothing capacitor connected in parallel to the second direct-current power supply; and
   a control part that can control the first inverter and the second inverter independently of each other,
   wherein
   when a difference between a first wave height value and a second wave height value is greater than or equal to a determination threshold value defined in advance and the first wave height value is larger than the second wave height value, the control part determines that the first smoothing capacitor has an open-circuit failure, and when a difference between the first wave height value and the second wave height value is greater than or equal to the determination threshold value and the second wave height value is larger than the first wave height value, the control part determines that the second smoothing capacitor has an open-circuit failure, the first wave height value being a wave height value of a current flowing through the first direct-current power supply and the second wave height value being a wave height value of a current flowing through the second direct-current power supply.

2. The rotating electrical machine control system according to claim 1, wherein the determination threshold value is set to a value based on a difference between a wave height value of a current flowing through one of direct-current power supplies connected to a smoothing capacitor having caused an open-circuit failure and a wave height value of a current flowing through one of the direct-current power supplies connected to a normal smoothing capacitor during output of defined torque, the smoothing capacitor and the normal smoothing capacitor each being one of the first smoothing capacitor and the second smoothing capacitor, and the defined torque being more than half of maximum torque that can be outputted from the rotating electrical machine.

3. The rotating electrical machine control system according to claim 2, wherein
   the rotating electrical machine is a drive power source that is mounted on a vehicle to drive wheels of the vehicle, and
   when the control part determines that the first smoothing capacitor or the second smoothing capacitor has an open-circuit failure, the control part limits torque and rotational speed that can be outputted from the rotating electrical machine within a defined range, and alerts a driver of the vehicle.

4. The rotating electrical machine control system according to claim 3, comprising: a first contactor that establishes and cuts off an electrical connection between the first direct-current power supply, and the first smoothing capacitor and the first inverter; and a second contactor that establishes and cuts off an electrical connection between the second direct-current power supply, and the second smoothing capacitor and the second inverter,
   wherein
   the first contactor is opened when a current flowing through the first direct-current power supply is greater than or equal to an overcurrent threshold value defined in advance,
   the second contactor is opened when a current flowing through the second direct-current power supply is greater than or equal to the overcurrent threshold value, and
   when a voltage at both ends of the first smoothing capacitor is less than or equal to a voltage for a short circuit defined in advance and a current flowing through the first direct-current power supply is less than or equal to a current for a short circuit defined in advance, the control part determines that the first smoothing capacitor has a short-circuit failure, and when a voltage at both ends of the second smoothing capacitor is less than or equal to the voltage for a short circuit and a current flowing through the second direct-current power supply is less than or equal to the current for a short circuit, the control part determines that the second smoothing capacitor has a short-circuit failure.

5. The rotating electrical machine control system according to claim 4, wherein
   in the first inverter and the second inverter, an arm for one alternating-current phase includes a series circuit of an upper-stage-side switching element and a lower-stage-side switching element,
   the control part can control each of the first inverter and the second inverter by active short-circuit control and shutdown control, the active short-circuit control bringing all of the upper-stage-side switching elements into off state and bringing all of the lower-stage-side switching elements into on state, or bringing all of the upper-stage-side switching elements into on state and bringing all of the lower-stage-side switching elements into off state, and the shutdown control bringing all of the switching elements of all of a plurality of phases into off state, and
   when the control part determines that the first smoothing capacitor or the second smoothing capacitor has a short-circuit failure, in a state in which a rotational speed of the rotating electrical machine is greater than or equal to a speed threshold value defined in advance, the control part controls both the first inverter and the second inverter by shutdown control, and
   in a state in which a rotational speed of the rotating electrical machine is less than the speed threshold value, the control part controls, by pulse width modulation control, one of inverters to which a normal smoothing capacitor is connected, and controls, by active short-circuit control, one of the inverters to which a smoothing capacitor having the short-circuit failure is connected, the inverters being the first inverter and the second inverter.

6. The rotating electrical machine control system according to claim 2, comprising: a first contactor that establishes and cuts off an electrical connection between the first direct-current power supply, and the first smoothing capacitor and the first inverter; and a second contactor that establishes and cuts off an electrical connection between the second direct-current power supply, and the second smoothing capacitor and the second inverter, wherein
the first contactor is opened when a current flowing through the first direct-current power supply is greater than or equal to an overcurrent threshold value defined in advance,
the second contactor is opened when a current flowing through the second direct-current power supply is greater than or equal to the overcurrent threshold value, and
when a voltage at both ends of the first smoothing capacitor is less than or equal to a voltage for a short circuit defined in advance and a current flowing through the first direct-current power supply is less than or equal to a current for a short circuit defined in advance, the control part determines that the first smoothing capacitor has a short-circuit failure, and when a voltage at both ends of the second smoothing capacitor is less than or equal to the voltage for a short circuit and a current flowing through the second direct-current power supply is less than or equal to the current for a short circuit, the control part determines that the second smoothing capacitor has a short-circuit failure.

7. The rotating electrical machine control system according to claim 6, wherein
in the first inverter and the second inverter, an arm for one alternating-current phase includes a series circuit of an upper-stage-side switching element and a lower-stage-side switching element,
the control part can control each of the first inverter and the second inverter by active short-circuit control and shutdown control, the active short-circuit control bringing all of the upper-stage-side switching elements into off state and bringing all of the lower-stage-side switching elements into on state, or bringing all of the upper-stage-side switching elements into on state and bringing all of the lower-stage-side switching elements into off state, and the shutdown control bringing all of the switching elements of all of a plurality of phases into off state, and
when the control part determines that the first smoothing capacitor or the second smoothing capacitor has a short-circuit failure, in a state in which a rotational speed of the rotating electrical machine is greater than or equal to a speed threshold value defined in advance, the control part controls both the first inverter and the second inverter by shutdown control, and
in a state in which a rotational speed of the rotating electrical machine is less than the speed threshold value, the control part controls, by pulse width modulation control, one of inverters to which a normal smoothing capacitor is connected, and controls, by active short-circuit control, one of the inverters to which a smoothing capacitor having the short-circuit failure is connected, the inverters being the first inverter and the second inverter.

8. The rotating electrical machine control system according to claim 1, wherein
the rotating electrical machine is a drive power source that is mounted on a vehicle to drive wheels of the vehicle, and
when the control part determines that the first smoothing capacitor or the second smoothing capacitor has an open-circuit failure, the control part limits torque and rotational speed that can be outputted from the rotating electrical machine within a defined range, and alerts a driver of the vehicle.

9. The rotating electrical machine control system according to claim 8, comprising: a first contactor that establishes and cuts off an electrical connection between the first direct-current power supply, and the first smoothing capacitor and the first inverter; and a second contactor that establishes and cuts off an electrical connection between the second direct-current power supply, and the second smoothing capacitor and the second inverter,
wherein
the first contactor is opened when a current flowing through the first direct-current power supply is greater than or equal to an overcurrent threshold value defined in advance,
the second contactor is opened when a current flowing through the second direct-current power supply is greater than or equal to the overcurrent threshold value, and
when a voltage at both ends of the first smoothing capacitor is less than or equal to a voltage for a short circuit defined in advance and a current flowing through the first direct-current power supply is less than or equal to a current for a short circuit defined in advance, the control part determines that the first smoothing capacitor has a short-circuit failure, and when a voltage at both ends of the second smoothing capacitor is less than or equal to the voltage for a short circuit and a current flowing through the second direct-current power supply is less than or equal to the current for a short circuit, the control part determines that the second smoothing capacitor has a short-circuit failure.

10. The rotating electrical machine control system according to claim 9, wherein
in the first inverter and the second inverter, an arm for one alternating-current phase includes a series circuit of an upper-stage-side switching element and a lower-stage-side switching element,
the control part can control each of the first inverter and the second inverter by active short-circuit control and shutdown control, the active short-circuit control bringing all of the upper-stage-side switching elements into off state and bringing all of the lower-stage-side switching elements into on state, or bringing all of the upper-stage-side switching elements into on state and bringing all of the lower-stage-side switching elements into off state, and the shutdown control bringing all of the switching elements of all of a plurality of phases into off state, and
when the control part determines that the first smoothing capacitor or the second smoothing capacitor has a short-circuit failure, in a state in which a rotational speed of the rotating electrical machine is greater than or equal to a speed threshold value defined in advance, the control part controls both the first inverter and the second inverter by shutdown control, and
in a state in which a rotational speed of the rotating electrical machine is less than the speed threshold value, the control part controls, by pulse width modulation control, one of inverters to which a normal smoothing capacitor is connected, and controls, by active short-circuit control, one of the inverters to which a smoothing capacitor having the short-circuit failure is connected, the inverters being the first inverter and the second inverter.

11. The rotating electrical machine control system according to claim 1, comprising: a first contactor that establishes and cuts off an electrical connection between the first direct-current power supply, and the first smoothing capacitor and the first inverter; and a second contactor that establishes and cuts off an electrical connection between the second direct-current power supply, and the second smoothing capacitor and the second inverter, wherein the first contactor is opened when a current flowing through the first direct-current power supply is greater than or equal to an overcurrent threshold value defined in advance, the second contactor is opened when a current flowing through the second direct-current power supply is greater than or equal to the overcurrent threshold value, and when a voltage at both ends of the first smoothing capacitor is less than or equal to a voltage for a short circuit defined in advance and a current flowing through the first direct-current power supply is less than or equal to a current for a short circuit defined in advance, the control part determines that the first smoothing capacitor has a short-circuit failure, and when a voltage at both ends of the second smoothing capacitor is less than or equal to the voltage for a short circuit and a current flowing through the second direct-current power supply is less than or equal to the current for a short circuit, the control part determines that the second smoothing capacitor has a short-circuit failure.

12. The rotating electrical machine control system according to claim 11, wherein in the first inverter and the second inverter, an arm for one alternating-current phase includes a series circuit of an upper-stage-side switching element and a lower-stage-side switching element, the control part can control each of the first inverter and the second inverter by active short-circuit control and shutdown control, the active short-circuit control bringing all of the upper-stage-side switching elements into off state and bringing all of the lower-stage-side switching elements into on state, or bringing all of the upper-stage-side switching elements into on state and bringing all of the lower-stage-side switching elements into off state, and the shutdown control bringing all of the switching elements of all of a plurality of phases into off state, and when the control part determines that the first smoothing capacitor or the second smoothing capacitor has a short-circuit failure, in a state in which a rotational speed of the rotating electrical machine is greater than or equal to a speed threshold value defined in advance, the control part controls both the first inverter and the second inverter by shutdown control, and in a state in which a rotational speed of the rotating electrical machine is less than the speed threshold value, the control part controls, by pulse width modulation control, one of inverters to which a normal smoothing capacitor is connected, and controls, by active short-circuit control, one of the inverters to which a smoothing capacitor having the short-circuit failure is connected, the inverters being the first inverter and the second inverter.

* * * * *